US012725791B2

(12) United States Patent
Liu et al.

(10) Patent No.: US 12,725,791 B2
(45) **Date of Patent: *Sep. 1, 2026**

(54) LONG-CYCLE-LIFE, HIGH-CAPACITY SILICON ANODES AND METHODS OF MAKING AND USING THE SAME

(71) Applicant: THE REGENTS OF THE UNIVERSITY OF CALIFORNIA, Oakland, CA (US)

(72) Inventors: Haodong Liu, San Diego, CA (US); Ping Liu, San Diego, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/170,765

(22) Filed: Apr. 4, 2025

(65) Prior Publication Data

US 2025/0260005 A1 Aug. 14, 2025

Related U.S. Application Data

(63) Continuation of application No. 18/276,513, filed as application No. PCT/US2022/016965 on Feb. 18, 2022.

(Continued)

(51) Int. Cl.
*H01M 4/36* (2006.01)
*C01B 33/02* (2006.01)
(Continued)

(52) U.S. Cl.
CPC ............. *H01M 4/366* (2013.01); *C01B 33/02* (2013.01); *H01M 4/364* (2013.01); *H01M 4/386* (2013.01);
(Continued)

(58) Field of Classification Search
None
See application file for complete search history.

(56) References Cited

U.S. PATENT DOCUMENTS 9,634,297 B2 4/2017 Kong et al.
2003/0082446 A1 5/2003 Chiang et al.
(Continued)

FOREIGN PATENT DOCUMENTS

WO 2016163964 A1 10/2016

OTHER PUBLICATIONS

Liu et al., Nature, 2020, 585, 63-67. (Year: 2020).*
(Continued)

*Primary Examiner* — Zhongqing Wei
(74) *Attorney, Agent, or Firm* — O'Connor & Company; Ryan P. O'Connor

(57) ABSTRACT

Materials, methods, electrodes, and devices related to high-energy-density, long-life Li-ion batteries are provided. The lithium-ion anode material contains a porous core with silicon and optionally carbon nanotubes, and a dense shell made from lithium vanadium oxide having a disordered rocksalt structure. The lithium vanadium oxide functions as a solid-state mediator layer for the anode material and overcomes the well-known problem of significant volume increase when silicon is lithiated. The lithium vanadium oxide possesses mechanical robustness and prevents electrolyte penetration. For these reasons, the anode material forms a highly stable interface with the battery electrolyte. Experimental data is presented and discussed to demonstrate embodiments of the technology. It is shown that the silicon anode material can reversibly deliver a specific capacity higher than 2500 mA·h/g. The anode material exhibits excellent cycling stability and calendar life at room temperature as well as elevated temperature.

15 Claims, 15 Drawing Sheets

Related U.S. Application Data

(60) Provisional application No. 63/151,547, filed on Feb. 19, 2021.

(51) Int. Cl.

| | |
|---|---|
| ***H01M 4/02*** | (2006.01) |
| ***H01M 4/38*** | (2006.01) |
| ***H01M 4/485*** | (2010.01) |
| ***H01M 4/587*** | (2010.01) |
| ***H01M 10/0525*** | (2010.01) |

(52) U.S. Cl.

CPC .......... *H01M 4/485* (2013.01); *H01M 4/587* (2013.01); *H01M 10/0525* (2013.01); *C01P 2002/02* (2013.01); *C01P 2002/72* (2013.01); *C01P 2004/03* (2013.01); *C01P 2004/61* (2013.01); *C01P 2004/62* (2013.01); *C01P 2004/64* (2013.01); *C01P 2004/80* (2013.01); *C01P 2006/40* (2013.01); *H01M 2004/021* (2013.01); *H01M 2004/027* (2013.01)

(56) References Cited

U.S. PATENT DOCUMENTS

| | | | | |
|---|---|---|---|---|
| 2003/0124423 | A1 | 7/2003 | Sasaki et al. | |
| 2010/0112440 | A1 | 5/2010 | Guyomard et al. | |
| 2014/0315097 | A1 | 10/2014 | Tan et al. | |
| 2015/0056507 | A1 | 2/2015 | Dadheech et al. | |
| 2016/0268593 | A1* | 9/2016 | Vogler | H01M 4/364 |
| 2016/0315311 | A1* | 10/2016 | Jeon | H01M 10/0525 |
| 2020/0194785 | A1* | 6/2020 | Jung | H01M 4/625 |
| 2020/0411828 | A1 | 12/2020 | Yamamoto et al. | |

OTHER PUBLICATIONS

PCT/US2019/027755 International Search Report and Written Opinion, Aug. 22, 2019.

PCT/US2019/027755 International Preliminary Report on Patentability, Oct. 20, 2020.

Liu et al., "A disordered rock salt anode for fast-charging lithium-ion batteries", Nature, vol. 585, Sep. 3, 2020, 63.

Linnell et al., "Lithiation of V203(SO4)2—a flexible insertion host", J. Mater. Chem. A, 2020, 8, 19502.

Ma et al., "Si-Based Anode Materials for Li-Ion Batteries: A Mini Review", Nano-Micro Lett. (2014) 6(4):347-358.

Maletti et al., "LiV308-Based Functional Separator Coating as Effective Polysulfide Mediator for Lithium-Sulfur Batteries", ACS Appl. Energy Mater. 2020, 3, 2893-2899.

PCT/US2022/016965 International Search Report and Written Opinion, Jun. 24, 2022.

PCT/US2022/016965 International Preliminary Report on Patentability, Aug. 22, 2023.

* cited by examiner

LONG-CYCLE-LIFE, HIGH-CAPACITY SILICON ANODES AND METHODS OF MAKING AND USING THE SAME

PRIORITY DATA

This patent application is a continuation application of U.S. patent application Ser. No. 18/276,513, filed on Aug. 9, 2023, which is a U.S. national-stage application under 35 U.S.C. § 371 from PCT/US2022/016965, filed on Feb. 18, 2022, which claims priority to U.S. Provisional Patent App. No. 63/151,547, filed on Feb. 19, 2021, each of which is hereby incorporated by reference herein.

FIELD

The present disclosure generally relates to lithium-ion batteries. More particularly, various embodiments relate to silicon-containing anode materials for lithium-ion battery materials.

BACKGROUND

Rechargeable lithium-ion batteries that can be safely charged and discharged at high rates are desirable for electrified transportation, portable electronics, grid storage, and other applications. For lithium-ion rechargeable batteries to meet society's ever-growing demands in electrical energy storage, novel electrode materials with a high charge-storage capacity are needed.

Large volume modifications during electrochemical cycling of electrodes in Li-ion batteries often limit successful applications due to stress formation, electrode fracture and delamination from the current collector.

Silicon is one of the most promising anode materials for lithium-ion batteries due to advantages including the highest known capacity and relatively low working potential. However, the practical implementation of Si anodes suffers from three major problems. First, poor cycle life of silicon materials results from pulverization during the huge volumetric fluctuations (up to 400%) which accompany lithium-ion intercalation and deintercalation. Second, drastic irreversible capacity loss and low coulombic efficiency are caused by mechanical fracture of Si anodes during the alloying/dealloying process. Finally, the solid electrolyte interphase (SEI) breaks as the nanostructure shrinks during silicon delithiation. The exposure of a fresh silicon surface to the electrolyte causes the SEI to keep growing thicker with each charge/discharge cycle. SEI formation and growth consume active lithium and electrolyte materials, leading to capacity fading, higher battery resistance, and poor power density.

Stable long-term performance of silicon as an anode material is limited due to the enormous volume expansion when a large number of Li atoms are incorporated into the silicon electrode during lithiation. The large volume increase often has the consequence of a decay of specific capacity during cycling that is attributed to stress formation, mechanical fracture, and irreversible side reactions that are invoked by the volume changes. Consequently, the development of Si-based Li-ion batteries faces great challenges due to the volume changes induced by cycling and the correlated capacity fading.

In view of the aforementioned needs in the art of lithium-ion batteries, improved anode materials, and in particular silicon-based anode materials, are needed.

SUMMARY

The present disclosure addresses the aforementioned needs in the art, as will now be summarized and then further described in detail below.

Some variations provide an anode material comprising:

(a) a porous anode phase comprising silicon, wherein the porous phase is characterized by a porous-phase volumetric porosity that is selected from about 5% to about 80%; and (b) a first solid-state mediator layer outwardly disposed on the porous anode phase, wherein the first solid-state mediator layer contains a lithium vanadium oxide material, wherein the lithium vanadium oxide material has a density of about 2.0 g/cm$^3$ to about 4.5 g/cm$^3$, wherein the lithium vanadium oxide material has a composition given by $Li_aV_bO_c$, wherein a=0-10, b=1-3, c=1-9, and a, b, and c are selected to charge-balance the $Li_aV_bO_c$, and wherein the $Li_aV_bO_c$ is capable of being reversibly lithiated.

In some embodiments, the anode material is a core-shell material in which the first solid-state mediator layer forms a shell that encapsulates the porous anode phase.

In some embodiments, the anode material is a sandwiched material in which the first solid-state mediator layer is outwardly disposed on a first side of the porous anode phase, wherein a second solid-state mediator layer is outwardly disposed on a second side of the porous anode phase, and wherein the second solid-state mediator layer contains the lithium vanadium oxide material.

The $Li_aV_bO_c$ may be present in a pre-lithiated state, wherein a=0 in the $Li_aV_bO_c$. Alternatively, such as prior to or during use of the anode material, the $Li_aV_bO_c$ is present in a lithiated state, wherein a>0 in the $Li_aV_bO_c$.

The $Li_aV_bO_c$ may be selected from the group consisting of $Li_3V_2O_5$, $Li_4V_2O_5$, $Li_5V_2O_5$, $LiVO_2$, $LiV_2O_5$, $Li_2V_2O_5$, $LiVO_3$, $LiV_3O_5$, $Li_2V_3O_5$, $Li_3V_3O_5$, $LiV_2O_3$, $Li_2V_2O_3$, $Li_3V_2O_3$, and combinations thereof. The $Li_aV_bO_c$ is preferably crystalline. The $Li_aV_bO_c$ may have a density of about 2.0 g/cm$^3$ to about 4.5 g/cm$^3$.

In preferred embodiments, at least 50 wt %, 60 wt %, 70 wt %, 80 wt %, 90 wt %, 95 wt %, or 99 wt % (such as 100 wt %) of the $Li_aV_bO_c$ has a disordered rocksalt structure in the $Fm\bar{3}m$ space group.

In some embodiments, the first solid-state mediator layer further contains a dopant M that is chemically or physically contained within the lithium vanadium oxide material such that its composition is given by $Li_aV_bO_cM_d$, wherein d=0.1-3, wherein a, b, c, and d are selected to charge-balance the $Li_aV_bO_cM_d$, and wherein the $Li_aV_bO_cM_d$ is capable of being reversibly lithiated. The dopant M may be selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof, for example. Preferably, at least 50 wt % or at least 90 wt % of the $Li_aV_bO_cM_d$ has a disordered rocksalt structure in the $Fm\bar{3}m$ space group.

In some embodiments, the porous-phase volumetric porosity is selected from about 20% to about 60%.

In some embodiments, the silicon is present in the porous anode phase in a concentration from about 1 wt % to 100 wt % Si. The silicon may be amorphous silicon, polycrystalline silicon, or single-crystalline silicon. The silicon may have an average particle size from about 10 nanometers to about 100 microns, for example. The silicon may be present as particles with a particle geometry selected from the group consisting of spheres, columns, cubes, cylinders, tubes, wires, sheets, fibers, irregular shapes, and combinations thereof, for example.

In some embodiments of the anode material, the porous anode phase does not contain carbon. In other embodiments of the anode material, the porous anode phase further contains carbon. The carbon may be selected from the group consisting of graphite, graphene, carbon nanotubes, carbon black, vapor-grown carbon fiber, ultra-fine carbon, and combinations thereof, for example.

The anode material may be present in an anode. The anode may further contain graphite, non-graphitized carbon, silicon oxides, tin, tin oxides, or a combination thereof. The anode may further contain one or more binders that are optionally selected from the group consisting of carboxymethyl cellulose, styrene-butadiene rubber, styrene-butadiene copolymer, polyvinylidene fluoride, and combinations thereof, or other homopolymers or copolymers, for example.

The anode, along with a cathode, may be present in a cell. The cathode may comprise a cathode material selected from the group consisting of $LiFePO_4$, $LiMn_2O_4$, $LiNi_{0.5}Mn_{1.5}O_4$, $LiNi_xCo_yMn_zO_2$ wherein x+y+z=1, $LiCoO_2$, $LiNi_xCo_yAl_zO_2$ wherein x+y+z=1, $LiFe_xMn_yPO_4$ wherein x+y=1, $aLiNi_xCo_yMn_zO_2\cdot(1-a)Li_2MnO_3$ wherein a=0-1 and x+y+z=1, and combinations thereof, for example.

Other variations provide an anode material that contains both silicon and carbon in a porous anode phase, the anode material comprising:

(a) a porous anode phase comprising a silicon-carbon composite containing silicon and carbon, wherein the porous anode phase is characterized by a porous-phase volumetric porosity that is selected from about 5% to about 80%; and (b) a first solid-state mediator layer outwardly disposed on the porous anode phase, wherein the first solid-state mediator layer contains a lithium vanadium oxide material, wherein the lithium vanadium oxide material has a density of about 2.0 g/cm$^3$ to about 4.5 g/cm$^3$, wherein the lithium vanadium oxide material has a composition given by $Li_aV_bO_c$, wherein a=0-10, b=1-3, c=1-9, and a, b, and c are selected to charge-balance the $Li_aV_bO_c$, and wherein the $Li_aV_bO_c$ is capable of being reversibly lithiated.

In some embodiments, the anode material is a core-shell material in which the first solid-state mediator layer forms a shell that encapsulates the porous anode phase.

In some embodiments, the anode material is a sandwiched material in which the first solid-state mediator layer is outwardly disposed on a first side of the porous anode phase, wherein a second solid-state mediator layer is outwardly disposed on a second side of the porous anode phase, and wherein the second solid-state mediator layer contains the lithium vanadium oxide material.

The porous-phase volumetric porosity may be selected from about 20% to about 60%, in certain embodiments.

In some embodiments, silicon is present in the porous anode phase in a concentration from about 1 wt % to about 99.9 wt % Si. The silicon may have an average particle size from about 10 nanometers to about 100 microns, for example. The silicon may be present as particles with a particle geometry selected from the group consisting of spheres, columns, cubes, cylinders, tubes, wires, sheets, fibers, irregular shapes, and combinations thereof, for example.

In some embodiments, carbon is present in the porous anode phase in a concentration from about 0.1 wt % to about 80 wt %. The carbon may be selected from the group consisting of graphite, graphene, carbon nanotubes, carbon black, vapor-grown carbon fiber, ultra-fine carbon, and combinations thereof, for example.

The $Li_aV_bO_c$ may be present in a pre-lithiated state, wherein a=0 in the $Li_aV_bO_c$. Alternatively, such as prior to or during use of the anode material, the $Li_aV_bO_c$ is present in a lithiated state, wherein a>0 in the $Li_aV_bO_c$.

The $Li_aV_bO_c$ may be selected from the group consisting of $Li_3V_2O_5$, $Li_4V_2O_5$, $Li_5V_2O_5$, $LiVO_2$, $LiV_2O_5$, $Li_2V_2O_5$, $LiVO_3$, $LiV_3O_5$, $Li_2V_3O_5$, $Li_3V_3O_5$, $LiV_2O_3$, $Li_2V_2O_3$, $Li_3V_2O_3$, and combinations thereof. The $Li_aV_bO_c$ is preferably crystalline. The $Li_aV_bO_c$ may have a density of about 2.0 g/cm$^3$ to about 4.5 g/cm$^3$.

In preferred embodiments, at least 50 wt %, 60 wt %, 70 wt %, 80 wt %, 90 wt %, 95 wt %, or 99 wt % (such as 100 wt %) of the $Li_aV_bO_c$ has a disordered rocksalt structure in the $Fm\bar{3}m$ space group.

In some embodiments, the first solid-state mediator layer further contains a dopant M that is chemically or physically contained within the lithium vanadium oxide material such that its composition is given by $Li_aV_bO_cM_d$, wherein d=0.1-3, wherein a, b, c, and d are selected to charge-balance the $Li_aV_bO_cM_d$, and wherein the $Li_aV_bO_cM_d$ is capable of being reversibly lithiated. The dopant M may be selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof, for example. Preferably, at least 50 wt % or at least 90 wt % of the $Li_aV_bO_cM_d$ has a disordered rocksalt structure in the $Fm\bar{3}m$ space group.

The anode material may be present in an anode. The anode may further contain graphite, non-graphitized carbon, silicon oxides, tin, tin oxides, or a combination thereof. The anode may further contain one or more binders present in a concentration from about 0.1 wt % to about 50 wt % in the anode. The binders may be selected from the group consisting of carboxymethyl cellulose, styrene-butadiene rubber, styrene-butadiene copolymer, polyvinylidene fluoride, and combinations thereof, or other homopolymers or copolymers, for example.

The anode may have an average anode thickness from about 200 nanometers to about 200 microns, for example.

The anode may be present in a cell, along with a cathode in the cell. The cathode may comprise a cathode material selected from the group consisting of $LiFePO_4$, $LiMn_2O_4$, $LiNi_{0.5}Mn_{1.5}O_4$, $LiNi_xCo_yMn_zO_2$ wherein x+y+z=1, $LiCoO_2$, $LiNi_xCo_yAl_zO_2$ wherein x+y+z=1, $LiFe_xMn_yPO_4$ wherein x+y=1, $aLiNi_xCo_yMn_zO_2\cdot(1-a)Li_2MnO_3$ wherein a=0-1 and x+y+z=1, and combinations thereof, for example.

Some variations provide a method of fabricating an anode material, the method comprising:

(i) providing a starting silicon-carbon composite containing silicon and carbon;

(ii) blending the starting silicon-carbon composite with a thermoplastic polymer having a melting point of about 300° C. or less, thereby generating a silicon-carbon-polymer composite;

(iii) solution-coating the silicon-carbon-polymer composite with a sol-gel solution containing vanadium oxide, thereby generating a silicon-carbon-polymer-vanadium oxide composite;

(iv) thermally treating the silicon-carbon-polymer-vanadium oxide composite at an effective temperature to decompose and/or vaporize the thermoplastic polymer, thereby generating a porous anode phase that is encapsulated by a shell containing crystallized vanadium oxide;

(v) chemically lithiating the crystallized vanadium oxide with a lithium-containing reducing agent, thereby generating a lithium vanadium oxide material with a composition given by $Li_aV_bO_c$, wherein a=0-10, b=1-3, c=1-9, and a, b, and c are selected to charge-balance the $Li_aV_bO_c$; and (vi) recovering an anode material containing the porous anode phase encapsulated by the lithium vanadium oxide material.

In some methods, the porous anode phase is characterized by a volumetric porosity selected from about 5% to about 80%. In certain methods, the volumetric porosity is selected from about 20% to about 60%.

In some methods, the silicon (in the porous anode phase) is present as particles with a particle geometry selected from the group consisting of spheres, columns, cubes, cylinders, tubes, wires, sheets, fibers, irregular shapes, and combinations thereof.

In some methods, the carbon (in the porous anode phase) is selected from the group consisting of graphite, graphene, carbon nanotubes, carbon black, vapor-grown carbon fiber, ultra-fine carbon, and combinations thereof.

In some methods, in step (iii), the vanadium oxide is $V_2O_5$ in the sol-gel solution.

In some methods, the effective temperature in step (iv) is selected from about 200° C. to about 500° C., such as from about 300° C. to about 400° C. The thermoplastic polymer may be polylactide (PLA), for example.

In some methods, the lithium-containing reducing agent is selected from the group consisting of butyl lithium ($LiC_4H_9$), lithium naphthalene ($LiC_{10}H_8$), lithium anthracenide ($LiC_{14}H_9$), and combinations thereof.

In some methods, the $Li_aV_bO_c$ is selected from the group consisting of $Li_3V_2O_5$, $Li_4V_2O_5$, $Li_5V_2O_5$, $LiVO_2$, $LiV_2O_5$, $Li_2V_2O_5$, $LiVO_3$, $LiV_3O_5$, $Li_2V_3O_5$, $Li_3V_3O_5$, $LiV_2O_3$, $Li_2V_2O_3$, $Li_3V_2O_3$, and combinations thereof. Preferably, at least 50 wt % of the $Li_aV_bO_c$ has a disordered rocksalt structure in the $Fm\bar{3}m$ space group. More preferably, at least 90 wt % of the $Li_aV_bO_c$ has a disordered rocksalt structure in the $Fm\bar{3}m$ space group.

In some methods, the lithium vanadium oxide material, fabricated in step (v), has a density of about 2.0 g/cm$^3$ to about 4.5 g/cm$^3$.

The method may further comprise adding a dopant M to the lithium vanadium oxide material such that its composition is given by $Li_aV_bO_cM_d$, wherein d=0.1-3, and wherein a, b, c, and d are selected to charge-balance the $Li_aV_bO_cM_d$. The dopant M may be selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof, for example. Preferably, at least 50 wt % or at least 90 wt % of the $Li_aV_bO_cM_d$ has a disordered rocksalt structure in the $Fm\bar{3}m$ space group.

The method may further comprise introducing, to the anode material, one or more additives selected from the group consisting of graphite, non-graphitized carbon, silicon oxides, tin, tin oxides, or a combination thereof, for example.

The method may further comprise introducing, to the anode material, one or more binders selected from the group consisting of carboxymethyl cellulose, styrene-butadiene rubber, styrene-butadiene copolymer, polyvinylidene fluoride, and combinations thereof, for example.

In some variations, the method further includes casting the anode material on a first substrate to form an anode; stacking a separator on the anode, wherein the separator includes an electrolyte; casting a cathode material on a second substrate to form a cathode; stacking the cathode on the separator; and surrounding the anode, the separator, and the cathode with a current collector to form a cell.

In the cell formed, the electrolyte may be selected from the group consisting of a liquid electrolyte, a polymer gel electrolyte, and combinations thereof. Preferably, the lithium vanadium oxide material is impermeable to the electrolyte.

In the cell formed, the anode may have an anode-material loading selected from about 0.2 mg/cm$^2$ to about 50 mg/cm$^2$. The anode may have an areal capacity on at least one side of the anode selected from about 0.05 mA·h/cm$^2$ to about 10 mA·h/cm$^2$. In certain embodiments, the anode has an areal capacity on both sides of the anode selected from about 0.05 mA·h/cm$^2$ to about 10 mA·h/cm$^2$. The anode thickness may be selected from about 200 nanometers to about 200 microns, for example.

When the cell undergoes at least one charge-discharge cycle, the lithium vanadium oxide material preferably has a volume change from 0% to about 20% during the charge-discharge cycle(s).

In typical embodiments, the cell is repeatedly charged and discharged over multiple charge-discharge cycles, wherein the $Li_aV_bO_c$ is reversibly lithiated and delithiated a plurality of times. The cell may be charged and discharged over at least 1000 cycles, for example.

DETAILED DESCRIPTION OF EMBODIMENTS

Figure 1:
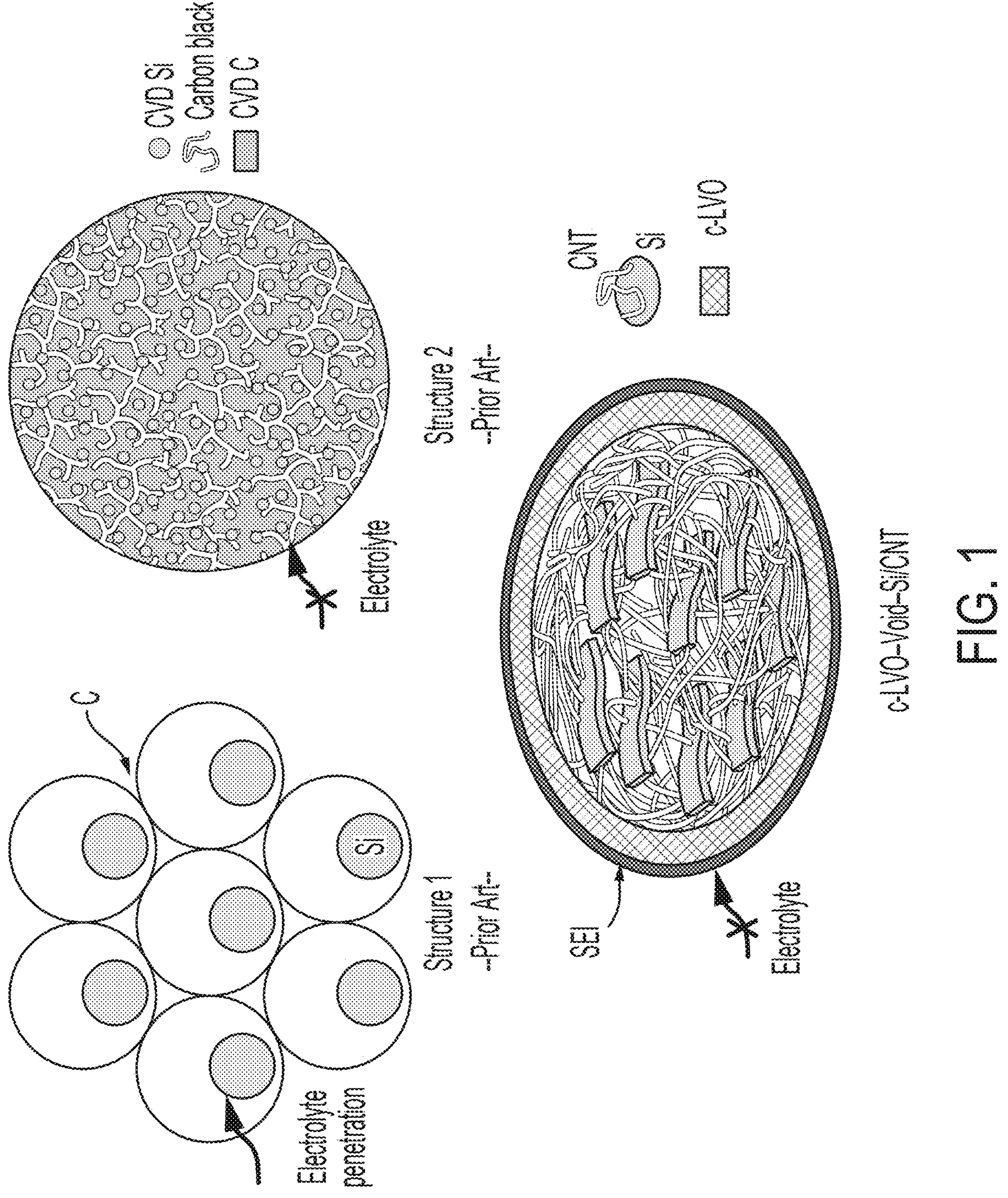
FIG. 1 includes several schematics which compare the state of the art for Si anode design (Structures 1 and 2) to the present technology, in some embodiments, providing c-LVO-Void-Si/CNT as an anode material.

The principles, compositions, materials, systems, and methods of the present disclosure will be described in detail by reference to various non-limiting embodiments of the technology.

This description will enable one skilled in the art to make and use the technology, and it describes several embodiments, adaptations, variations, alternatives, and uses of the technology. These and other embodiments, features, and advantages of the present technology will become more apparent to those skilled in the art when taken with reference to the following detailed description in conjunction with the accompanying drawings.

Unless defined otherwise, all technical and scientific terms used herein have the same meaning as is commonly understood by one of ordinary skill in the art to which this technology belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising" (synonymously, "including"), "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of." The term "including" should be read as meaning "including, without limitation" or the like; the term "example" is used to provide exemplary instances of the item in discussion, not an exhaustive or limiting list thereof.

Adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this patent application refers to technologies that would be apparent or known to one of ordinary skill in the art, such technologies encompass those apparent or known to the skilled artisan now or at any time in the future.

As used in this specification and the appended claims, the singular forms "a," "an," and "the" include plural referents unless the context clearly indicates otherwise. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Silicon (Si) holds much promise to increase the energy density of lithium-ion batteries due to silicon's lithium storage capacity of 4200 mA·h/g, a lithium storage capacity ten times greater than that of graphite. Research and development effort has focused on improving Si's cycle life, which is limited by an associated large volume change coupled with a non-mechanically-compliant solid electrolyte interface (SEI) layer. The SEI layer is a passivation layer formed on the surface of lithium-ion battery anode materials produced by electrolyte decomposition. The quality of the SEI layer plays an important role in the cyclability, rate capacity, irreversible capacity loss, and safety of lithium-ion batteries.

Existing design criteria for long-life Si anodes are well-established and include maintaining electrical connection to the Si during cycling by limiting particle fracture, as well as minimizing the change of electrochemical interfacial area and the fracture of the SEI layer.

Current Si anode technology typically employs Si nanostructures to manage volume change without fracture. Si nanoparticles, nanowires, nanotubes, thin films, and porous structures have all demonstrated the ability to mitigate particle fracture. Nanostructures are often assembled into larger particles in order to minimize the contact area with the electrolyte. Otherwise, the high surface area of the nanomaterial exaggerates the SEI formation. In Li||Si half cells, a long cycle life of over 1000 cycles has been demonstrated. In addition to using nanostructures to mitigate fracture, some existing technology limits the specific capacity range (i.e., x in $Li_xSi$) to improve cycle life. In addition to the success of Si cycling in half cells, progress has been made in full cells as well when a Si anode is paired with 4 V cathodes. Some cells have been demonstrated with stable cycling for 500-1000 cycles.

However, during storage, the capacity fade of a Si cell has conventionally been a linear function of lifetime capacity throughput. This linear correlation indicates that the active lithium consumption rate through the battery's life is constant—the SEI is not effectively passivating. This problem has been observed even when the Si anodes are coated with carbon, despite the fact that graphite is known to be a good passivating material, due to the complex chemistry associated with the SEI layer. The chemical composition of the SEI layer may include a variety of organic species (e.g., organic polymers) and inorganic species (e.g., LiF). The underlying Si structure imposes a mechanical stress on the carbon surface coating, which in turn transmits to the SEI on carbon. Heretofore, continuous fracture and spalling of the SEI may occur, leading to fast capacity fading during storage or cycling.

The present invention is predicated, at least in part, on the use of dense lithium vanadium oxides, which are ionically conductive and electronically conductive, as a solid-state mediator layer in a long-cycle-life Si anode material. The lithium vanadium oxides are mechanically more robust than carbon and are more impermeable to the electrolyte, if the lithium vanadium oxides are densified. In addition, the polar nature of lithium vanadium oxides also likely makes them adhere to the SEI layer well.

In addition to the oxide shell material to protect Si, it is desirable to select a Si architecture that allows volume expansion while minimizing the stress applied to the shell. Existing technologies attempt to use a pomegranate-like structure. The secondary particles are usually sealed with a carbon coating to limit electrolyte invasion into the internal pores while conducting $Li^+$ ions. However, there are challenges in building the pomegranate structure.

The present invention is predicated, at least in part, on the design of a porous anode phase with an optimized porosity, to accommodate volume expansion of silicon, while also utilizing the above-mentioned dense lithium vanadium oxides. In some preferred embodiments, the presently disclosed technology may be employed to fabricate a core of silicon sheets and carbon nanotubes, wherein the core has built-in porosity, and a shell of dense LVO. In this disclosure, “LVO” refers to $Li_aV_bO_c$ when there is no dopant present, and $Li_aV_bO_cM_d$ when there are one or more dopants present (see below for ranges of a, b, c, and d). LVO is a recently discovered reversible host for lithium in the potential region between 0 V and 2 V. The built-in porosity accommodates volume expansion of silicon during lithiation. The dense layer features a highly stable interface with the electrolyte, has minimal volume change, and enjoys extremely rapid kinetics, capable of delivering half of its capacity in a few seconds. Compared to carbon, LVO is mechanically strong and serves as a rapid charge-transfer mediator to Si.

Some variations provide an anode material comprising:

(a) a porous anode phase comprising silicon, wherein the porous phase is characterized by a porous-phase volumetric porosity that is selected from about 5% to about 80%; and (b) a first solid-state mediator layer outwardly disposed on the porous anode phase, wherein the first solid-state mediator layer contains a lithium vanadium oxide material, wherein the lithium vanadium oxide material has a density of about 2.0 g/cm$^3$ to about 4.5 g/cm$^3$, wherein the lithium vanadium oxide material has a composition given by $Li_aV_bO_c$, wherein a=0-10, b=1-3, c=1-9, and a, b, and c are selected to charge-balance the $Li_aV_bO_c$, and wherein the $Li_aV_bO_c$ is capable of being reversibly lithiated.

In some embodiments, the anode material is a core-shell material in which the first solid-state mediator layer forms a shell that encapsulates the porous anode phase. By “encapsulates” it is meant that the solid-state mediator layer fully encloses the porous anode phase.

In some embodiments, the anode material is a sandwiched material in which the first solid-state mediator layer is outwardly disposed on a first side of the porous anode phase, wherein a second solid-state mediator layer is outwardly disposed on a second side of the porous anode phase, and wherein the second solid-state mediator layer contains the lithium vanadium oxide material.

The $Li_aV_bO_c$ may be present in a pre-lithiated state, wherein a=0 in the $Li_aV_bO_c$. During use of the anode material, and potentially prior to use of the anode material, the $Li_aV_bO_c$ is present in a lithiated state, wherein a>0 in the $Li_aV_bO_c$. When in a lithiated state, the value of a may be about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, or 5.0, for example.

The $Li_aV_bO_c$ may be selected from the group consisting of $Li_3V_2O_5$, $Li_4V_2O_5$, $Li_5V_2O_5$, $LiVO_2$, $LiV_2O_5$, $Li_2V_2O_5$, $LiVO_3$, $LiV_3O_5$, $Li_2V_3O_5$, $Li_3V_3O_5$, $LiV_2O_3$, $Li_2V_2O_3$, $Li_3V_2O_3$, and combinations thereof. Non-integer values of a, b, and c are possible, as long as the $Li_aV_bO_c$ is charge-balanced.

The $Li_aV_bO_c$ is preferably crystalline, or has a crystallinity of at least 80%, at least 85%, at least 90%, at least 95%, at least 99%, or 100%. $LiV_bO_c$ with a crystallinity of at least 80% is referred to herein as crystalline LVO, or c-LVO. LVO crystallinity may be measured using X-ray diffraction.

The $Li_aV_bO_c$ may have a density of about 2.0 g/cm$^3$ to about 4.5 g/cm$^3$. In various embodiments, the $Li_aV_bO_c$ has a density of about, at least about, or at most about 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, or 4.5 g/cm$^3$, including any intervening ranges.

In preferred embodiments, at least 50 wt %, 60 wt %, 70 wt %, 80 wt %, 90 wt %, 95 wt %, or 99 wt % (such as 100 wt %) of the $Li_aV_bO_c$ has a disordered rocksalt structure in the $Fm\bar{3}m$ space group. In this disclosure, “DRS” refers to a disordered rocksalt structure. A disordered rocksalt structure is described by Liu et al., “A disordered rock salt anode for fast-charging lithium-ion batteries”, *Nature* volume 585, pages 63-67 (2020), which is hereby incorporated by reference.

In some embodiments, the first solid-state mediator layer further contains a dopant M that is chemically or physically contained within the lithium vanadium oxide material such that its composition is given by $Li_aV_bO_cM_d$, wherein d=0.1-3, wherein a, b, c, and d are selected to charge-balance the $Li_aV_bO_cM_d$, and wherein the $Li_aV_bO_cM_d$ is capable of being reversibly lithiated.

Dopants may be used to modify the properties of the LVO. For example, dopants may be used to adjust lithiation, delithiation, or other kinetics; lithiation capacity; LVO stability; and/or other factors. The dopant M may be selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof, for example. Multiple dopants may be present in $Li_aV_bO_cM_d$, in which case each dopant in the empirical formula may have d=0.1-3. The dopants may include one or more divalent, trivalent, tetravalent, pentavalent, or hexavalent dopants.

The $Li_aV_bO_cM_d$ may have a density of about 2.0 g/cm$^3$ to about 4.5 g/cm$^3$. Preferably, at least 50 wt % or at least 90 wt % of the $Li_aV_bO_cM_d$ has a disordered rocksalt structure in the $Fm\bar{3}m$ space group. In various embodiments, at least 50 wt %, 60 wt %, 70 wt %, 80 wt %, 90 wt %, 95 wt %, or 99 wt % (such as 100 wt %) of the $Li_aV_bO_cM_d$ has a disordered rocksalt structure in the $Fm\bar{3}m$ space group.

The thickness of the first solid-state mediator layer may be selected from about 5 nm to about 1 μm, for example. In various embodiments, the thickness of the first solid-state mediator layer is about 5 nm, 10 nm, 20 nm, 30 nm, 40 nm, 50 nm, 60 nm, 70 nm, 80 nm, 90 nm, 100 nm, 125 nm, 150 nm, 175 nm, 200 nm, 225 nm, 250 nm, 275 nm, 300 nm, 350 nm, 400 nm, 450 nm, 500 nm, 550 nm, 600 nm, 650 nm, 700 nm, 750 nm, 800 nm, 850 nm, 900 nm, or 950 nm, including any intervening ranges (e.g., 10-300 nanometers). The thickness of the first solid-state mediator layer may be uniform throughout the anode material, or may vary along a dimension of the porous anode phase.

In embodiments employing a sandwiched material rather than an encapsulated material, the thickness of the second solid-state mediator layer may be selected from about 5 nm to about 1 μm, for example. In various embodiments, the thickness of the second solid-state mediator layer is about 5 nm, 10 nm, 20 nm, 30 nm, 40 nm, 50 nm, 60 nm, 70 nm, 80 nm, 90 nm, 100 nm, 125 nm, 150 nm, 175 nm, 200 nm, 225 nm, 250 nm, 275 nm, 300 nm, 350 nm, 400 nm, 450 nm, 500 nm, 550 nm, 600 nm, 650 nm, 700 nm, 750 nm, 800 nm, 850 nm, 900 nm, or 950 nm, including any intervening ranges (e.g., 10-300 nanometers). The thickness of the second solid-state mediator layer may be the same or different than the thickness of the first solid-state mediator layer. Typically, the two thicknesses are the same or approximately the same, but that need not be the case.

The size of the porous anode phase may be selected from about 50 nm to about 100 μm, for example. The size of the porous anode phase refers to the average effective diameter of the porous anode phase, wherein the effective diameter is the diameter of a sphere with equivalent volume as the volume of the porous anode phase, regardless of geometry. In various embodiments, the size of the porous anode phase is about 50 nm, 100 nm, 200 nm, 300 nm, 400 nm, 500 nm, 600 nm, 700 nm, 800 nm, 900 nm, 1 μm, 2 μm, 3 μm, 4 μm, 5 μm, 10 μm, 15 μm, 20 μm, 25 μm, 30 μm, 40 μm, 50 μm, 60 μm, 70 μm, 80 μm, 90 μm, or 100 μm, including any intervening ranges.

In some embodiments, the porous-phase volumetric porosity is selected from about 20% to about 60%. In various embodiments, the porous-phase volumetric porosity is about, at least about, or at most about 5%, 10%, 15%, 20%, 25%, 30%, 35%, 40%, 45%, 50%, 55%, 60%, 65%, 70%, 75%, or 80%, including any intervening ranges (e.g., 10-70%, 30-50%, etc.).

In some embodiments, the silicon is present in the porous anode phase in a concentration selected from about 1 wt % to 100 wt % Si. In various embodiments, the silicon is present in the porous anode phase in a concentration of about, at least about, or at most about 1, 2, 5, 10, 15, 20, 25, 30, 35, 40, 45, 50, 55, 60, 65, 70, 75, 80, 85, 90, 95, 98, 99, or 100 wt %, including any intervening ranges.

The silicon may be amorphous silicon, polycrystalline silicon, or single-crystalline silicon. There may be amorphous silicon particles in a mixture with polycrystalline silicon particles. There may be polycrystalline silicon particles in a mixture with single-crystalline silicon particles. There may be amorphous silicon particles in a mixture with both polycrystalline silicon particles and single-crystalline silicon particles.

The silicon may have an average particle size selected from about 10 nanometers to about 10 microns, for example. In various embodiments, the silicon has an average particle size of about, at least about, or at most about 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, or 10 μm, including any intervening ranges. In some embodiments, the silicon particles are in the nanoparticle size range (less than 1000 nm). For non-spherical Si particles (e.g., sheets), the above sizes refer to the effective diameter which is the diameter of a sphere with equivalent volume as the Si particle of arbitrary shape.

Particle sizes may be measured by a variety of techniques, including dynamic light scattering, laser diffraction, or image analysis, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

The silicon may be present as particles with a particle geometry selected from the group consisting of spheres, columns, cubes, cylinders, tubes, wires, sheets, fibers, irregular shapes, and combinations thereof, for example. In certain embodiments, the silicon is primarily present as Si sheets or nanosheets.

In some embodiments of the anode material, the porous anode phase does not contain carbon. In other embodiments of the anode material, the porous anode phase further contains carbon. The carbon may be selected from the group consisting of graphite, graphene, carbon nanotubes, carbon black, vapor-grown carbon fiber, ultra-fine carbon, and combinations thereof, for example. Other carbon nanostructures are possible, besides carbon nanotubes, including fullerenes, which may geometrically be hollow spheres, ellipsoids, tubes, sheets, or other shapes. The carbon may be nanoparticles, microparticles, or a combination thereof. In various embodiments, the carbon has an average particle size of about, at least about, or at most about 1 nm, 2 nm, 5 nm, 10 nm, 15 nm, 20 nm, 30 nm, 40 nm, 50 nm, 100 nm, 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, or 10 μm, including any intervening ranges.

The anode material may be present in an anode. The anode may further contain graphite, non-graphitized carbon, silicon oxides, tin, tin oxides, or a combination thereof. The anode may further contain one or more binders that are optionally selected from the group consisting of carboxymethyl cellulose, styrene-butadiene rubber, styrene-butadiene copolymer, polyvinylidene fluoride, and combinations thereof, or other homopolymers or copolymers, for example.

The anode, along with a cathode, may be present in a cell. A "cell" is an electrochemical cell that is capable of either generating electrical energy from chemical reactions or using electrical energy to cause chemical reactions.

The cathode may comprise a cathode material selected from the group consisting of $LiFePO_4$, $LiMn_2O_4$, $LiNi_{0.5}Mn_{1.5}O_4$, $LiNi_xCo_yMn_zO_2$ wherein x+y+z=1, $LiCoO_2$, $LiNi_xCo_yAl_zO_2$ wherein x+y+z=1, $LiFe_xMn_yPO_4$ wherein x+y=1, $aLiNi_xCo_yMn_zO_2\cdot(1-a)Li_2MnO_3$ wherein a=0-1 and x+y+z=1, and combinations thereof, for example.

Other variations provide an anode material that contains both silicon and carbon in a porous anode phase, the anode material comprising:

(a) a porous anode phase comprising a silicon-carbon composite containing silicon and carbon, wherein the porous anode phase is characterized by a porous-phase volumetric porosity that is selected from about 5% to about 80%; and (b) a first solid-state mediator layer outwardly disposed on the porous anode phase, wherein the first solid-state mediator layer contains a lithium vanadium oxide material, wherein the lithium vanadium oxide material has a density of about 2.0 g/cm$^3$ to about 4.5 g/cm$^3$, wherein the lithium vanadium oxide material has a composition given by $Li_aV_bO_c$, wherein a=0-10, b=1-3, c=1-9, and a, b, and c are selected to charge-balance the $Li_aV_bO_c$, and wherein the $Li_aV_bO_c$ is capable of being reversibly lithiated.

In some embodiments, the anode material is a core-shell material in which the first solid-state mediator layer forms a shell that encapsulates the porous anode phase.

In some embodiments, the anode material is a sandwiched material in which the first solid-state mediator layer is outwardly disposed on a first side of the porous anode phase, wherein a second solid-state mediator layer is outwardly disposed on a second side of the porous anode phase, and wherein the second solid-state mediator layer contains the lithium vanadium oxide material.

The porous-phase volumetric porosity may be selected from about 20% to about 60%, in certain embodiments. In various embodiments, the porous-phase volumetric porosity is about, at least about, or at most about 5%, 10%, 15%, 20%, 25%, 30%, 35%, 40%, 45%, 50%, 55%, 60%, 65%, 70%, 75%, or 80%, including any intervening ranges (e.g., 10-70%, 30-50%, etc.).

In some embodiments, silicon is present in the porous anode phase in a concentration from about 1 wt % to about 99.9 wt % Si. In various embodiments, the silicon is present in the porous anode phase in a concentration of about, at least about, or at most about 1, 2, 5, 10, 15, 20, 25, 30, 35, 40, 45, 50, 55, 60, 65, 70, 75, 80, 85, 90, 95, 98, 99, or 100 wt %, including any intervening ranges.

The silicon may be amorphous silicon, polycrystalline silicon, or single-crystalline silicon. There may be amorphous silicon particles in a mixture with polycrystalline silicon particles. There may be polycrystalline silicon particles in a mixture with single-crystalline silicon particles. There may be amorphous silicon particles in a mixture with both polycrystalline silicon particles and single-crystalline silicon particles.

The silicon may have an average particle size selected from about 10 nanometers to about 10 microns, for example. In various embodiments, the silicon has an average particle size of about, at least about, or at most about 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, or 10 μm, including any intervening ranges. In some embodiments, the silicon particles are in the nanoparticle size range (less than 1000 nm). For non-spherical Si particles (e.g., sheets), the above sizes refer to the effective diameter which is the diameter of a sphere with equivalent volume as the Si particle of arbitrary shape.

The silicon may be present as particles with a particle geometry selected from the group consisting of spheres, columns, cubes, cylinders, tubes, wires, sheets, fibers, irregular shapes, and combinations thereof, for example.

In some embodiments, carbon is present in the porous anode phase in a concentration from about 0.1 wt % to about 80 wt %. In various embodiments, the carbon is present in the porous anode phase in a concentration of about, at least about, or at most about 0.1, 0.5, 1, 2, 5, 10, 15, 20, 25, 30, 35, 40, 45, 50, 55, 60, 65, 70, 75, or 80 wt %, including any intervening ranges.

The carbon may be selected from the group consisting of graphite, graphene, carbon nanotubes, carbon black, vapor-grown carbon fiber, ultra-fine carbon, and combinations thereof, for example.

The $Li_aV_bO_c$ may be present in a pre-lithiated state, wherein a=0 in the $Li_aV_bO_c$. During use of the anode material, and potentially prior to use of the anode material, the $Li_aV_bO_c$ is present in a lithiated state, wherein a>0 in the $Li_aV_bO_c$. When in a lithiated state, the value of a may be about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, or 5.0, for example.

The $Li_aV_bO_c$ may be selected from the group consisting of $Li_3V_2O_5$, $Li_4V_2O_5$, $Li_5V_2O_5$, $LiVO_2$, $LiV_2O_5$, $Li_2V_2O_5$, $LiVO_3$, $LiV_3O_5$, $Li_2V_3O_5$, $Li_3V_3O_5$, $LiV_2O_3$, $Li_2V_2O_3$, $Li_3V_2O_3$, and combinations thereof. Non-integer values of a, b, and c are possible, as long as the $Li_aV_bO_c$ is charge-balanced.

The $Li_aV_bO_c$ is preferably crystalline, or has a crystallinity of at least 80%, at least 85%, at least 90%, at least 95%, at least 99%, or 100%. $LiV_bO_c$ with a crystallinity of at least 80% is referred to herein as crystalline LVO, or c-LVO. LVO crystallinity may be measured using X-ray diffraction.

The $Li_aV_bO_c$ may have a density of about 2.0 g/cm$^3$ to about 4.5 g/cm$^3$. In various embodiments, the $Li_aV_bO_c$ has a density of about, at least about, or at most about 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, or 4.5 g/cm$^3$, including any intervening ranges.

In preferred embodiments, at least 50 wt %, 60 wt %, 70 wt %, 80 wt %, 90 wt %, 95 wt %, or 99 wt % (such as 100 wt %) of the $Li_aV_bO_c$ has a disordered rocksalt structure in the $Fm\bar{3}m$ space group.

In some embodiments, the first solid-state mediator layer further contains a dopant M that is chemically or physically contained within the lithium vanadium oxide material such that its composition is given by $Li_aV_bO_cM_d$, wherein d=0.1-3, wherein a, b, c, and d are selected to charge-balance the $Li_aV_bO_cM_d$, and wherein the $Li_aV_bO_cM_d$ is capable of being reversibly lithiated. The dopant M may be selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof, for example.

The $Li_aV_bO_cM_d$ may have a density of about 2.0 g/cm$^3$ to about 4.5 g/cm$^3$. Preferably, at least 50 wt % or at least 90 wt % of the $Li_aV_bO_cM_d$ has a disordered rocksalt structure in the $Fm\bar{3}m$ space group. In various embodiments, at least 50 wt %, 60 wt %, 70 wt %, 80 wt %, 90 wt %, 95 wt %, or 99 wt % (such as 100 wt %) of the $Li_aV_bO_cM_d$ has a disordered rocksalt structure in the $Fm\bar{3}m$ space group.

The thickness of the anode material may be selected from about 50 nm to about 10 μm, for example. In various embodiments, the thickness of the anode material is about 50 nm, 100 nm, 150 nm, 200 nm, 250 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, or 10 μm, including any intervening ranges.

The thickness of the first solid-state mediator layer may be selected from about 5 nm to about 1 μm, for example. In various embodiments, the thickness of the first solid-state mediator layer is about 5 nm, 10 nm, 20 nm, 30 nm, 40 nm, 50 nm, 60 nm, 70 nm, 80 nm, 90 nm, 100 nm, 125 nm, 150 nm, 175 nm, 200 nm, 225 nm, 250 nm, 275 nm, 300 nm, 350 nm, 400 nm, 450 nm, 500 nm, 550 nm, 600 nm, 650 nm, 700 nm, 750 nm, 800 nm, 850 nm, 900 nm, or 950 nm, including any intervening ranges (e.g., 50-250 nanometers). The thickness of the first solid-state mediator layer may be uniform throughout the anode material, or may vary along a dimension of the porous anode phase.

In embodiments employing a sandwiched material rather than an encapsulated material, the thickness of the second solid-state mediator layer may be selected from about 5 nm to about 1 μm, for example. In various embodiments, the thickness of the second solid-state mediator layer is about 5 nm, 10 nm, 20 nm, 30 nm, 40 nm, 50 nm, 60 nm, 70 nm, 80 nm, 90 nm, 100 nm, 125 nm, 150 nm, 175 nm, 200 nm, 225 nm, 250 nm, 275 nm, 300 nm, 350 nm, 400 nm, 450 nm, 500 nm, 550 nm, 600 nm, 650 nm, 700 nm, 750 nm, 800 nm, 850 nm, 900 nm, or 950 nm, including any intervening ranges (e.g., 10-300 nanometers). The thickness of the second solid-state mediator layer may be the same or different than the thickness of the first solid-state mediator layer. Typically, the two thicknesses are the same or approximately the same, but that need not be the case.

The thickness of the porous anode phase may be selected from about 100 nm to about 100 μm, for example. In various embodiments, the thickness of the porous anode phase is about 100 nm, 200 nm, 300 nm, 400 nm, 500 nm, 600 nm, 700 nm, 800 nm, 900 nm, 1 μm, 2 μm, 3 μm, 4 μm, 5 μm, 10 μm, 15 μm, 20 μm, 25 μm, 30 μm, 40 μm, 50 μm, 60 μm, 70 μm, 80 μm, 90 μm, or 100 μm, including any intervening ranges.

In some embodiments, the porous-phase volumetric porosity is selected from about 20% to about 60%. In various embodiments, the porous-phase volumetric porosity is about, at least about, or at most about 5%, 10%, 15%, 20%, 25%, 30%, 35%, 40%, 45%, 50%, 55%, 60%, 65%, 70%, 75%, or 80%, including any intervening ranges.

The anode material may be present in an anode. The anode may further contain graphite, non-graphitized carbon, silicon oxides, tin, tin oxides, or a combination thereof.

The anode may further contain one or more binders present in a concentration selected from about 0.1 wt % to about 50 wt % in the anode. In various embodiments, the anode contains one or more binders in a concentration of about 0.1, 0.5, 1, 2, 5, 10, 15, 20, 25, 30, 35, 40, 45, or 50 wt %, including any intervening ranges.

The binders may be selected from the group consisting of carboxymethyl cellulose, styrene-butadiene rubber, styrene-butadiene copolymer, polyvinylidene fluoride, and combinations thereof, or other homopolymers or copolymers, for example.

The anode may have an average anode thickness selected from about 200 nanometers to about 200 microns, for example. In various embodiments, the anode has an average anode thickness of about 200 nm, 300 nm, 400 nm, 500 nm, 1 μm, 2 μm, 5 μm, 10 μm, 20 μm, 30 μm, 40 μm, 50 μm, 75 μm, 100 μm, 125 μm, 150 μm, 175 μm, or 200 μm, including any intervening ranges.

The anode may be present in a cell, along with a cathode in the cell. The cathode may comprise a cathode material selected from the group consisting of $LiFePO_4$, $LiMn_2O_4$, $LiNi_{0.5}Mn_{1.5}O_4$, $LiNi_xCo_yMn_zO_2$ wherein x+y+z=1, $LiCoO_2$, $LiNi_xCo_yAl_zO_2$ wherein x+y+z=1, $LiFe_xMn_yPO_4$ wherein x+y=1, $aLiNi_xCo_yMn_zO_2\cdot(1-a)Li_2MnO_3$ wherein a=0-1 and x+y +z=1, and combinations thereof, for example. A certain cathode material is $LiNi_{0.8}Co_{0.1}Mn_{0.1}O_2$ (NMC811). For example, with 80 wt % Si, the anode material has a reversible capacity of 2500 mA·h/g, readily enabling a 350 W·h/kg cell when paired with a $LiNi_{0.8}Co_{0.1}Mn_{0.1}O_2$ cathode and common carbonate-based electrolytes.

The presently disclosed technology may be used in the design of a battery. A battery consists of one or more cells, connected in parallel and/or in series. Battery configurations vary widely, as is well-known, including cylindrical, prismatic and pouch cells, for example. The battery may include the anode, the cathode, extra Li sources, and a current collector (e.g., copper foil), for example.

In some embodiments, the LVO-protected Si may be processed into an anode. In certain embodiments, the LVO-protected Si may be prelithiated to compensate for the Li inventory. The negative electrode (anode) may pair with a 4 V cathode such as $LiNi_{0.8}Co_{0.1}Mn_{0.1}O_2$. The electrodes may be alternately stacked to make a pouch-type cell, or rolled up to make a cylinder cell. The cell may deliver a high energy density of 350 W·h/kg or higher.

The battery may employ one or more electrolytes selected from non-aqueous electrolytes, aqueous electrolytes, and ionic liquids, for example. The electrolyte generally includes a lithium salt (anion plus lithium cation) in a solvent.

Lithium salts include, but are not limited to, $LiClO_4$, $LiBF_4$, $LiPF_6$, $LiCF_3SO_3$, $LiCF_3CO_2$, $LiN(FSO_2)_2$ (lithium bis(fluorosulfonyl)imide), $LiN(CF_3SO_2)_2$(lithium bis(trifluoromethanesulfonyl)imide). $LiAsF_6$, $LiSbF_6$, $LiAlCl_4$, LiCl, LiBr, and LiI, which may be used alone or as a mixture of two or more. $LiBF_4$ and $LiPF_6$ are preferable, in some embodiments.

Examples of the solvent that can be used in the electrolyte include aprotic organic solvents, such as propylene carbonate, ethylene carbonate, butylene carbonate, dimethyl carbonate, diethyl carbonate, methyl ethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, dioxane, acetonitrile, nitromethane, ethyl monoglyme, phosphoric triesters, trimethoxymethane, dioxolane derivatives, sulfolane, 3-methyl-2-oxazolidinone, propylene carbonate derivatives, tetrahydrofuran derivatives, ethyl ether, 1,3-propanesultone, N-methyl acetamide, acetonitrile, acetals, ketals, sulfones, sulfolanes, aliphatic ethers, cyclic ethers, glymes, polyethers, phosphate esters, siloxanes, dioxolanes, and N-alkylpyrrolidones. As is known in the art, other minor components and impurities can be present in the electrolyte.

In some embodiments, the presently disclosed technology may be used in a new battery system that is superior to conventional graphite battery packs and which has a lower number of cells in the battery pack. This battery system may utilize any one (or more) of the disclosed anode structures, and may be coupled with a 4 V high-capacity cathode, such as Li-rich oxides and/or $Li(NiMnCo)O_2$ layered oxides. This battery system may achieve specific energies in excess of 350 W·h/kg. The battery voltage may be higher than 3.7 V. The battery may be capable of 1000 cycles with <10% capacity loss, and may be stable after storage at 55° C. for 2 weeks with <10% capacity loss. This high-energy-density battery system is suitable for many commercial applications, including electric vehicles, smart devices, and high-power portable devices with high energy density.

In some embodiments, the presently disclosed anode material has a unique structure, which enables long cycle life (e.g., up to 3000 cycles or more) and long calendar life (e.g., up to 10 years or more) due to a complete lack of contact between electrolyte and the Si. The carbon (e.g., CNT) network structure also provides mechanical support to the LVO shell to reduce the mechanical stress during calendaring and cycling. Experimental results (see the Examples) using a LVO/Si multilayer structure confirms the ability of LVO to isolate Si from the liquid electrolyte, leading to stable cycling and dramatically improved coulombic efficiency under storage at 55° C.

One exemplary method to fabricate an anode material is as follows. The interior void space may be created by the thermal vaporization of poly(lactic acid) (PLA) at a suitable temperature, such as 200° C., leaving no residual organics. PLA is a thermoplastic with a melting point of 160° C. and is also soluble in propylene carbonate, for example, which enables fabrication of the core structure by simple melt blending or precipitation from an emulsion. The shell structure may be formed by solution-coating from a $V_2O_5$ sol-gel solution followed by modest thermal treatment at 350° C., which vaporizes the PLA, crystallizes the oxide, and seals off the shell. Chemical lithiation may then be employed to generate the LVO shell structure.

Some variations provide a method of fabricating an anode material, the method comprising:

(i) providing a starting silicon-carbon composite containing silicon and carbon;

(ii) blending the starting silicon-carbon composite with a thermoplastic polymer having a melting point of about 300° C. or less, thereby generating a silicon-carbon-polymer composite;

(iii) solution-coating the silicon-carbon-polymer composite with a sol-gel solution containing vanadium oxide, thereby generating a silicon-carbon-polymer-vanadium oxide composite;

(iv) thermally treating the silicon-carbon-polymer-vanadium oxide composite at an effective temperature to decompose and/or vaporize the thermoplastic polymer, thereby generating a porous anode phase that is encapsulated by a shell containing crystallized vanadium oxide;

(v) chemically lithiating the crystallized vanadium oxide with a lithium-containing reducing agent, thereby generating a lithium vanadium oxide material with a composition given by $Li_aV_bO_c$, wherein a=0-10, b=1-3, c=1-9, and a, b, and c are selected to charge-balance the $Li_aV_bO_c$; and (vi) recovering an anode material containing the porous anode phase encapsulated by the lithium vanadium oxide material.

In some methods, the porous anode phase is characterized by a volumetric porosity selected from about 5% to about 80%. In certain methods, the volumetric porosity is selected from about 20% to about 60%.

In some methods, the silicon (in the porous anode phase) is present as particles with a particle geometry selected from the group consisting of spheres, columns, cubes, cylinders, tubes, wires, sheets, fibers, irregular shapes, and combinations thereof.

In some methods, the carbon (in the porous anode phase) is selected from the group consisting of graphite, graphene, carbon nanotubes, carbon black, vapor-grown carbon fiber, ultra-fine carbon, and combinations thereof.

In some methods, in step (iii), the vanadium oxide is $V_2O_5$ in the sol-gel solution. Other vanadium oxides include, but are not limited to, VO, $V_2O_3$, $VO_2$, $V_3O_5$, $V_3O_7$, $V_4O_9$, $V_6O_{13}$, $V_4O_7$, $V_5O_9$, $V_6O_{11}$, $V_7O_{13}$, and $V_8O_{15}$.

In some methods, the effective temperature in step (iv) is selected from about 200° C. to about 500° C., such as from about 300° C. to about 400° C. In various embodiments, the temperature in step (iv) is about, at least about, or at most about 150° C., 200° C., 250° C., 300° C., 350° C., 400° C., 450° C., 500° C., 550° C., or 600° C., including any intervening ranges.

The thermoplastic polymer may be polylactide (PLA), for example. Other thermoplastic polymers that may be used include, but are not limited to, polyhydroxyalkanoates, polyethylene, polypropylene, and polyethylene terephthalate.

In some methods, the lithium-containing reducing agent is selected from the group consisting of butyl lithium ($LiC_4H_9$), lithium naphthalene ($LiC_{10}H_8$), lithium anthracenide ($LiC_{14}H_9$), and combinations thereof.

In some methods, the $Li_aV_bO_c$ is selected from the group consisting of $Li_3V_2O_5$, $Li_4V_2O_5$, $Li_5V_2O_5$, $LiVO_2$, $LiV_2O_5$, $Li_2V_2O_5$, $LiVO_3$, $LiV_3O_8$, $Li_2V_3O_8$, $Li_3V_3O_8$, $LiV_2O_3$, $Li_2V_2O_3$, $Li_3V_2O_3$, and combinations thereof. Preferably, at least 50 wt % of the $Li_aV_bO_c$ has a disordered rocksalt structure in the $Fm\bar{3}m$ space group. More preferably, at least 90 wt % of the $Li_aV_bO_c$ has a disordered rocksalt structure in the $Fm\bar{3}m$ space group.

In some methods, the lithium vanadium oxide material, fabricated in step (v), has a density of about 2.0 g/cm$^3$ to about 4.5 g/cm$^3$. In various embodiments, the $Li_aV_bO_c$ has a density of about, at least about, or at most about 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, or 4.5 g/cm$^3$, including any intervening ranges.

The method may further comprise adding a dopant M to the LVO material such that its composition is given by $Li_aV_bO_cM_d$, wherein d=0.1-3, and wherein a, b, c, and d are selected to charge-balance the $Li_aV_bO_cM_d$. The dopant M may be selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof, for example. Preferably, at least 50 wt % or at least 90 wt % of the $Li_aV_bO_cM_d$ has a disordered rocksalt structure in the $Fm\bar{3}m$ space group.

The method may further comprise introducing, to the anode material, one or more additives selected from the group consisting of graphite, non-graphitized carbon, silicon oxides, tin, tin oxides, or a combination thereof, for example.

The method may further comprise introducing, to the anode material, one or more binders selected from the group consisting of carboxymethyl cellulose, styrene-butadiene rubber, styrene-butadiene copolymer, polyvinylidene fluoride, and combinations thereof, for example.

In some variations, the method further includes casting the anode material on a first substrate to form an anode; stacking a separator on the anode, wherein the separator includes an electrolyte; casting a cathode material on a second substrate to form a cathode; stacking the cathode on the separator; and surrounding the anode, the separator, and the cathode with a current collector to form a cell. In the cell formed, the electrolyte may be selected from the group consisting of a liquid electrolyte, a polymer gel electrolyte, and combinations thereof.

Preferably, the lithium vanadium oxide material is impermeable to the electrolyte. By "impermeable" it is meant that during cell cycling, no more than 0.1 wt % of the electrolyte penetrates through the lithium vanadium oxide material such that it is deposited in an SEI layer and/or penetrates into the porous anode phase. Preferably, no more than 0.01 wt %, and more preferably no more than 0.001 wt %, of the electrolyte penetrates through the lithium vanadium oxide material. Most preferably, essentially no detectible electrolyte penetrates through the lithium vanadium oxide material. Note that some electrolyte may be adsorbed onto the lithium vanadium oxide material or absorbed partially in the lithium vanadium oxide material, yet still not penetrate all the way through the lithium vanadium oxide material.

In the cell formed, the anode may have an anode-material loading selected from about 0.2 mg/cm$^2$ to about 50 mg/cm$^2$. In various embodiments, the anode-material loading is about, or at least about 0.2, 0.5, 1, 2, 3, 4, 5, 10, 15, 20, 25, 30, 35, 40, 45, or 50 mg/cm$^2$, including any intervening ranges.

The anode may have an areal capacity on at least one side of the anode selected from about 0.05 mA·h/cm$^2$ to about 10 mA·h/cm$^2$. In certain embodiments, the anode has an areal capacity on both sides of the anode selected from about 0.05 mA·h/cm$^2$ to about 10 mA·h/cm$^2$. In various embodiments, the anode has an areal capacity on both sides of the anode of about, or at least about 0.05, 0.1, 0.2, 0.5, 1, 1.5, 2, 2.5, 3, 4, 5, 6, 7, 8, 9, or 10 mA·h/cm$^2$, including any intervening ranges.

In typical embodiments, the cell is repeatedly charged and discharged over multiple charge-discharge cycles, wherein the $Li_aV_bO_c$ is reversibly lithiated and delithiated a plurality of times. The cell may be charged and discharged over at least 1000 cycles, for example. In various embodiments, the number of charge-discharge cycles is 1, 2, 3, 4, 5, 10, 20, 30, 40, 50, 60, 70, 80, 90, 100, 200, 300, 400, 500, 600, 700, 800, 900, 1000, 1100, 1200, 1500, 2000, 2500, 3000, 3500, 4000, 4500, or 5000, or even more, for example.

When the cell undergoes at least one charge-discharge cycle, the lithium vanadium oxide material preferably has a volume change from 0% to about 20% during the charge-discharge cycle(s). In various embodiments, after one charge-discharge cycle, the lithium vanadium oxide material has a volume change of about, or at most about 20%, 19%, 18%, 17%, 16%, 15%, 14%, 13%, 12%, 11%, 10%, 9%, 8%, 7%, 6%, 5.5%, 5%, 4.5%, 4%, 3.5%, 3%, 2.5%, 2%, 1.5%, 1%, 0.9%, 0.8%, 0.7%, 0.6%, 0.5%, 0.4%, 0.3%, 0.2%, 0.1%, or 0.0%, including any intervening ranges. In various embodiments, after 2, 3, 4, 5, 10, 20, 30, 40, 50, 60, 70, 80, 90, 100, 200, 300, 400, 500, 600, 700, 800, 900, or 1000 charge-discharge cycles, the lithium vanadium oxide material has a volume change of about, or at most about 20%, 19%, 18%, 17%, 16%, 15%, 14%, 13%, 12%, 11%, 10%, 9%, 8%, 7%, 6%, 5.5%, 5%, 4.5%, 4%, 3.5%, 3%, 2.5%, 2%, 1.5%, 1%, 0.9%, 0.8%, 0.7%, 0.6%, 0.5%, 0.4%, 0.3%, 0.2%, 0.1%, or 0.0%, including any intervening ranges.

The technology disclosed herein, in accordance with various embodiments, will now be described in more detail with reference to the drawings (FIGS. 1-15). The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration, these drawings are not necessarily to scale.

FIG. 1 includes several schematics which compare the state of the art for Si anode design (Structures 1 and 2) to the present technology, in some embodiments, providing c-LVO-Void-Si/CNT as an anode material.

Structure 1 (prior art) in FIG. 1 may be obtained by a multistep process, as follows. Si is first oxidized to form a $SiO_2$—Si core-shell structure ($SiO_2$ shell and Si core) which is coated with a resorcinol-formaldehyde gel. The structure is then polysized to form a C—$SiO_2$—Si structure (C outer shell, $SiO_2$ inner shell, and Si core). $SiO_2$ is then etched with hydrogen fluoride to form a C-void-Si structure (C shell, void space, and Si core). Unfortunately, the carbon matrix is inherently porous as confirmed by the etching process. These internal pores suffer from electrolyte penetration that leads to SEI formation inside.

Structure 2 (prior art) in FIG. 1 employs chemical vapor deposition (CVD) to deposit nano-Si from a silane source into a porous carbon network, followed by CVD of a carbon coating. This process can potentially result in a dense coating. However, the coating thickness and the coating robustness during cycling is unknown. In addition, the CVD Si process needs to be very precisely controlled so that the desired size and distribution of Si can be obtained, which greatly reduces its ease of scalability.

By contrast to Structures 1 and 2, the structure c-LVO-Void-Si/CNT in FIG. 1 is provided by the present technology. The c-LVO is crystalline lithium vanadium oxide which functions as a dense, solid-state mediator layer. The c-LVO forms a shell around a core consisting of Si, carbon nanotubes (CNT), and voids. "Si/CNT" may be referred to as a silicon-carbon composite, "Void-Si/CNT" may be referred to as a porous anode phase, and c-LVO may be referred to as a solid-state mediator layer. The solid-state mediator layer c-LVO is outwardly disposed on the Void-Si/CNT porous anode phase. The carbon nanotubes are shown in the c-LVO-Void-Si/CNT architecture of FIG. 1 as long tortuous tubes. Other forms of carbon may be utilized rather than CNT—for example, graphene, carbon fibers, etc.

As depicted in FIG. 1, the c-LVO-Void-Si/CNT anode material may include a core of Si sheets and carbon nanotubes with built-in porosity (from the voids) to accommodate Si volume expansion. The ~10% porosity in FIG. 1 is exemplary only; the porous-phase volumetric porosity may generally range from about 5% to about 80%, for example. The shell is made of dense, crystalline lithium vanadium oxide (c-LVO), such as, but not limited to, $Li_{3+x}V_2O_5$ where x=0-2. The $Li_{3+x}V_2O_5$ replaces the commonly used carbon coating used in conventional nanostructured Si anodes. The presently disclosed anode material forms a highly stable interface (the SEI layer in FIG. 1) with the battery electrolyte. The anode material demonstrates excellent cycling stability (long cycle life) and long calendar life.

Figure 2:
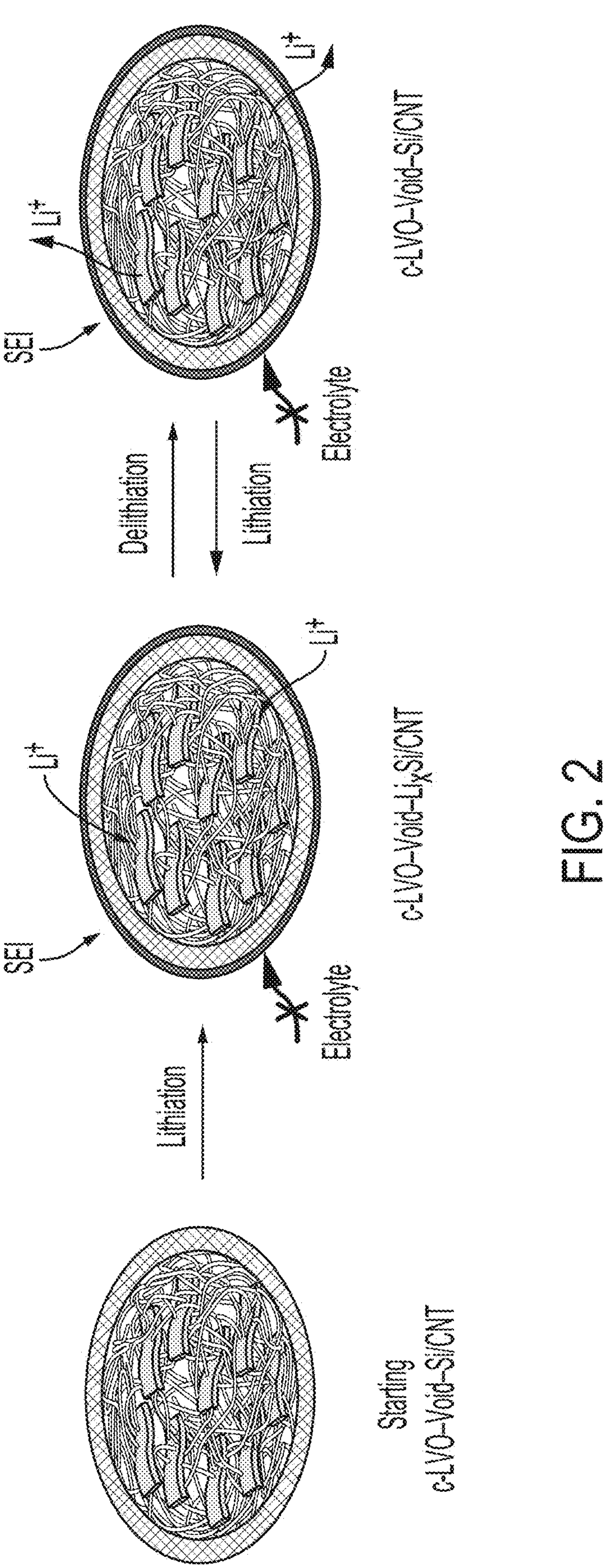
FIG. 2 includes several schematics which illustrate some embodiments of the LVO solid-state mediator layer on silicon-carbon composites.

FIG. 2 includes several schematics which illustrate embodiments of the LVO solid-state mediator layer on silicon-carbon composites. A starting material of LVO-Void-Si/CNT is provided. The crystalline lithium vanadium oxide (c-LVO) shell is dense, highly ion-conducting, and impermeable to electrolyte. Lithiation forms a LVO-Void-$Li_xSi$/CNT material, along with a SEI layer. The LVO shell blocks penetration of electrolyte. Upon delithiation of LVO-Void-$Li_xSi$/CNT, LVO-Void-Si/CNT is formed again, the SEI layer remains, the electrolyte penetration is still blocked by the LVO shell.

In embodiments of the technology disclosed herein, including embodiments shown in FIG. 2, the LVO protective layer provides several important features:

(1) the LVO layer is lithium-ion conducting;

(2) the LVO layer is impermeable to electrolyte;

(3) the LVO layer is capable of forming a stable SEI with the electrolyte that is truly passivating with invariant interfacial area;

(4) the LVO layer is an effective intercalation host for lithium in the potential region of Si operation; and (5) the LVO layer is mechanically robust.

In some embodiments, the anode material has a discharge capacity greater than 2500 mA·h/g, which is much higher than a graphite anode. In addition, the anode material can achieve long cycle life and calendar life without a complicated fabrication process. In some embodiments, the anode material is capable of 1000 cycles with less than capacity 10% loss. In some embodiments, the anode material maintains stability after storage at 55° C. for 2 weeks with less than 10% capacity loss. This anode material enables a long-life, high-energy cell with a specific energy density greater than 350 W·h/kg.

Figure 3:
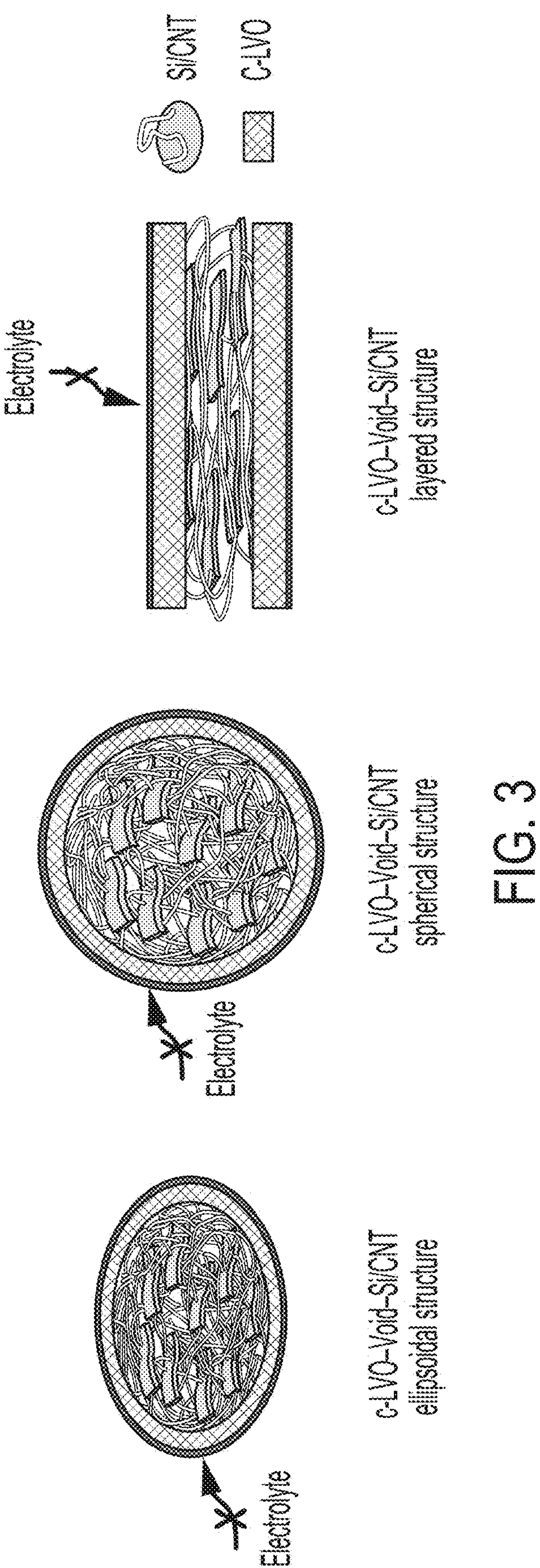
FIG. 3 includes several schematics which illustrate exemplary geometries of the c-LVO-Void-Si/CNT anode material.

FIG. 3 includes several schematics which illustrate exemplary geometries of the c-LVO-Void-Si/CNT anode material. Exemplary geometries include an ellipsoidal structure, a spherical structure, and a layered structure. Incorporation of a CNT network into the core provides substantial mechanical support to the LVO shell during compression, releasing the stress on the shell itself. The LVO shell is preferably ductile enough to respond to the silicon expansion without breaking, providing excellent protection of the Si from the electrolyte.

Figure 4:
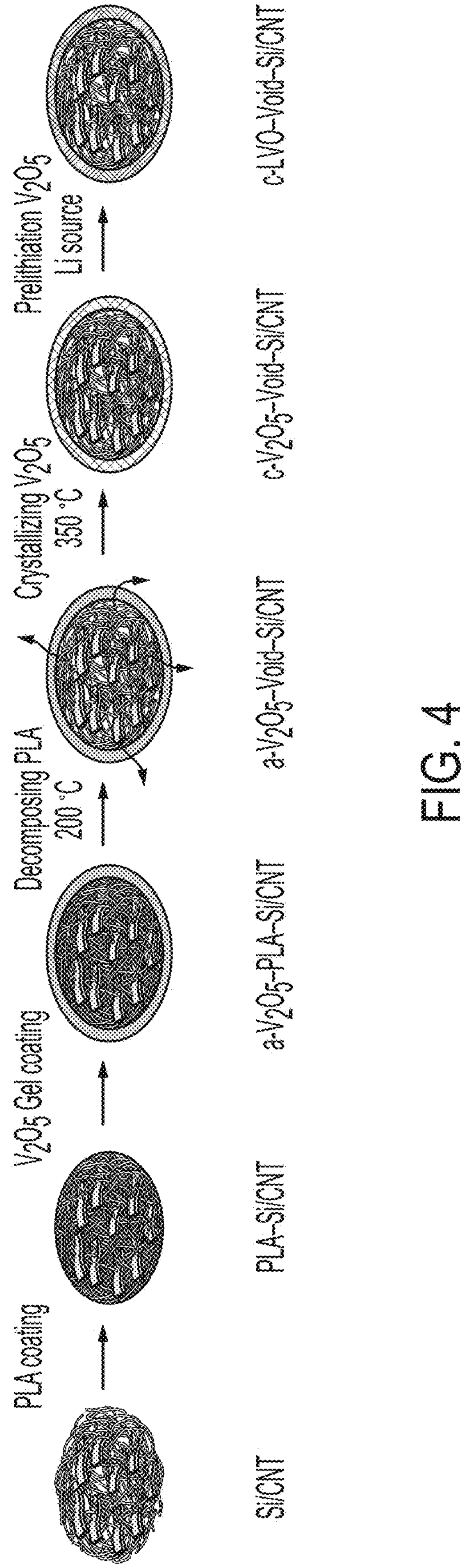
FIG. 4 shows an exemplary a process to fabricate c-LVO-Void-Si/CNT, in some embodiments.

FIG. 4 shows an exemplary a process to fabricate c-LVO-Void-Si/CNT. Si particles (e.g., Si sheets) are mixed with CNT and PLA to form a core of PLA-Si/CNT, which is coated with a $V_2O_5$ gel dissolved in $H_2O_2$, using a sol-gel technique, to form a-$V_2O_5$-PLA-Si/CNT (a-$V_2O_5$=amorphous $V_2O_5$) as a composite gel. PLA is chosen, in some embodiments, because it can decompose and evaporate at 200° C., long before the crystallization of $V_2O_5$ at 350° C. (c-$V_2O_5$=crystalline $V_2O_5$). The PLA is optionally doped with a catalytic amount of $SnO_2$. The composite gel is heated to evaporate the solvent, followed by the decomposition of PLA, which vaporizes at 200-300° C. to form gaseous products. Further heating to 350° C. promotes the crystallization of $V_2O_5$ to make c-$V_2O_5$ (crystalline $V_2O_5$), which eliminates porosity in the shell. Chemical lithiation, such as with lithium metal and/or butyl lithium, converts the c-$V_2O_5$ to the c-LVO solid-state mediator layer, thereby forming the final c-LVO-Void-Si/CNT material. This process forms a hollow structure without chemical etching or chemical vapor deposition, and seals the shell by crystallization, achieving an ideal structure with a scalable process flow.

Figure 5:
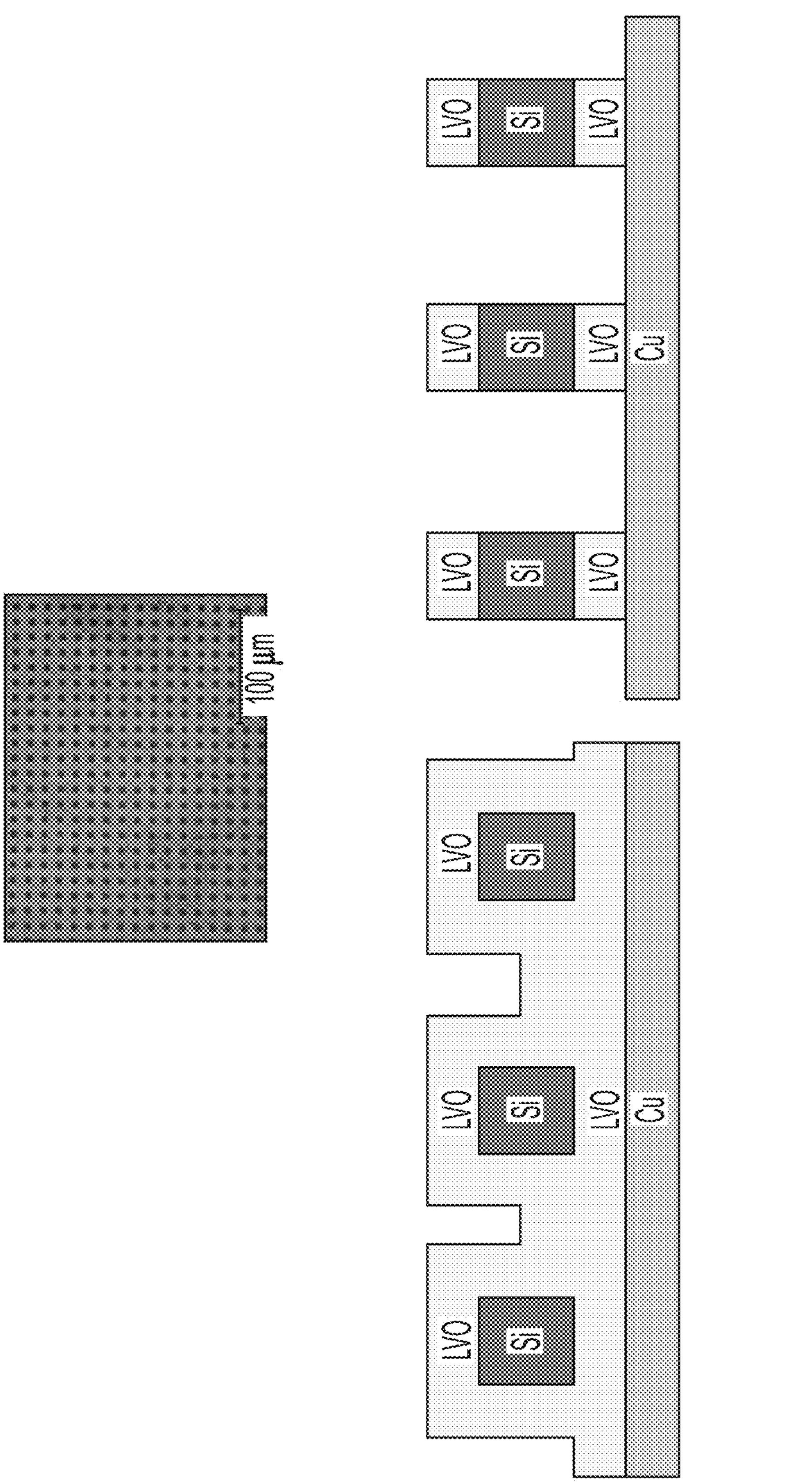
FIG. 5 depicts exemplary structures of patterned Si electrodes, in some embodiments.

FIG. 5 depicts exemplary structures of patterned Si electrodes, in some embodiments. An Si array on copper (Cu) can be fabricated through a nickel (Ni) mesh grid as a mask. LVO-Si multilayer structures fabricated by electron-beam evaporation may be used to examine the thickness requirements for LVO-Si in order to prevent LVO fracture and electrolyte penetration into Si during electrochemical cycling. Two configurations are shown in FIG. 5: a first configuration with the Si completely encapsulated, and a second configuration with sides of Si exposed.

The first structure (FIG. 5, bottom-left side) is a fully enclosed structure, that is, patterned Si fully enclosed by LVO. The Si may or may not also contain carbon (e.g., CNT). For example, a Cu foil substrate is first coated with $V_2O_5$ by electron-beam evaporation. A Ni mesh is then mounted as a convenient mask (the mask is shown at the top of FIG. 5) and held in firm contact with the surface to grow the patterned Si films by electron-beam evaporation. The top structure of FIG. 5 is a top view of an exemplary mask. Meshes are available in difference sizes, e.g., 2000 mesh (with hole size of 7.6 μm×7.6 μm). Pattern sizes down to 1 μm may be employed, using lithographic techniques. The thickness of the Si is controlled by the deposition time. The mask is then removed and another layer of $V_2O_5$ is deposited as a capping layer. The entire structure is then thermally annealed at 350° C. for 1 hour, for example, to promote the crystallization of $V_2O_5$. The crystallized $V_2O_5$ is then lithiated to form LVO. The sides of the Si layer are sealed (fully enclosed) by the LVO.

In the first configuration of FIG. 5, the Si pattern size may be from about 1 μm to about 10 μm, the film thickness may be from about 50 nm to about 1 μm or larger, and the LVO thickness may be from about 10 nm to about 300 nm, for example. The mechanical properties of LVO may allow the use of thicker Si films (i.e., >1 μm). In certain embodiments, a Si island with its height and size on the same order helps minimize the effect of the substrate, so that the observed mechanical stability directly reflects the Si/LVO interaction.

In a second configuration (FIG. 5, bottom-right side), a LVO/Si/LVO sandwich structure with size and thickness similar to the first configuration is deposited. The only necessary change during fabrication is to use the mask (top of FIG. 5) for the deposition of all three layers (LVO, then Si, then another LVO). The crystallized $V_2O_5$ may be lithiated to form LVO after each LVO layer is formed, or after all layers are fabricated. In this second configuration, the sides of the Si layer are not sealed. Therefore, the Si layer is not directly mechanically constrained, and the edges are in contact with the liquid electrolyte. However, when there is a small ratio between thickness and size, the relative contact area is extremely small. Further, the Si film is free to expand in the height direction.

Compared to the prior art, both approaches in FIG. 5 can better accommodate the Si volume change during cycling, mitigating delamination and capacity loss by minimizing the stress exerted by the Cu substrate.

Figure 6:
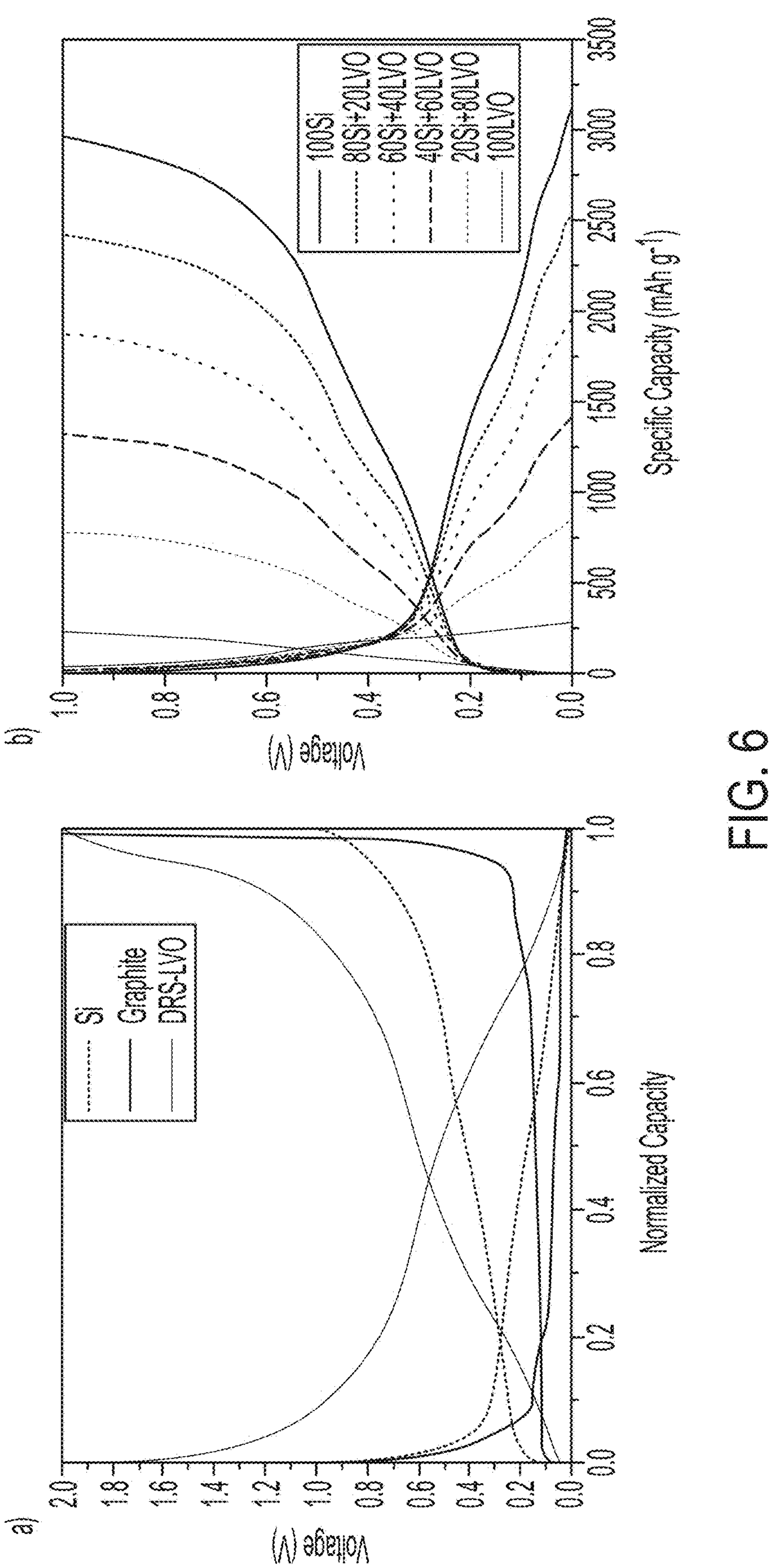
FIG. 6 illustrates the performance of a LVO solid-state mediator layer on Si, in some embodiments.

FIG. 6 illustrates the performance of an exemplary LVO solid-state mediator layer on Si. The LVO is an intercalation host for lithium in the 0-2 V range with substantial capacity in the potential range of Si cycling. At the potential of Si delithiation (up to 1 V), LVO operates in the middle of its state of charge (SOC) while graphite is completely delithiated. This property is important for LVO to serve as a redox mediator to Si.

FIG. 6(*a*) shows the charge-discharge profile for LVO, while charge-discharge profiles for silicon and graphite are included for comparison. FIG. 6(*b*) shows simulated charge-discharge curves for different Si/LVO ratios. The simulated charge-discharge curves show how the capacity varies with the ratio between Si and LVO. At a high loading of Si, such as 80 wt %, the capacity contribution from LVO is negligible, and the electrode has a reversible capacity of 2500 mA·h/g. All the volume change from Si is accounted for by the voids in the particles, so electrode expansion is expected to be minimal.

Figure 7:
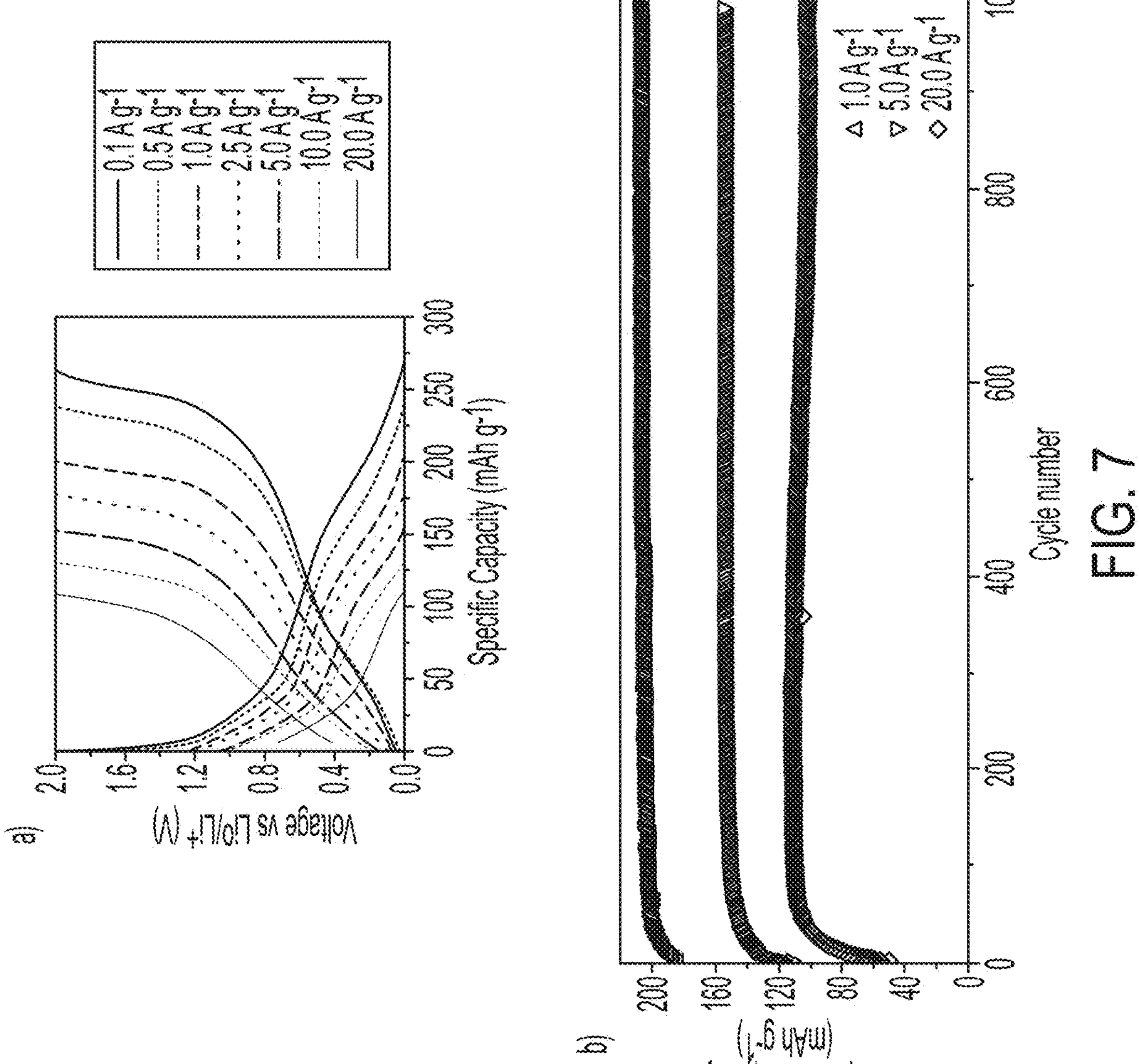
FIG. 7 illustrates the performance of a LVO solid-state mediator layer as an intercalation host for lithium, in some embodiments.

FIG. 7 illustrates the performance of a LVO solid-state mediator layer as an intercalation host for lithium. $V_2O_5$ is a well-studied cathode material. When it is lithiated to 1.5 V, $V_2O_5$ forms $Li_3V_2O_5$ with a disordered rocksalt structure. In some embodiments, the disordered rocksalt phase can accept even more lithium to form $Li_4V_2O_5$ or $Li_5V_2O_5$ upon further lithiation, leading to a reversible capacity of 260 mA·h/g. There is negligible hysteresis between lithiation and delithiation, in contrast to $TiO_2$, for example. As illustrated in FIG. 7, LVO is among the very few oxides that undergo stable intercalation rather than decomposition between 0-1 V. LVO is an intercalation host for lithium in the 0-2 V range with substantial capacity in the potential range of Si cycling. LVO has extremely fast kinetics and exceptional cycling stability, which is preferred for protecting Si. LVO is therefore a highly stable intercalation host for lithium.

Figure 8:
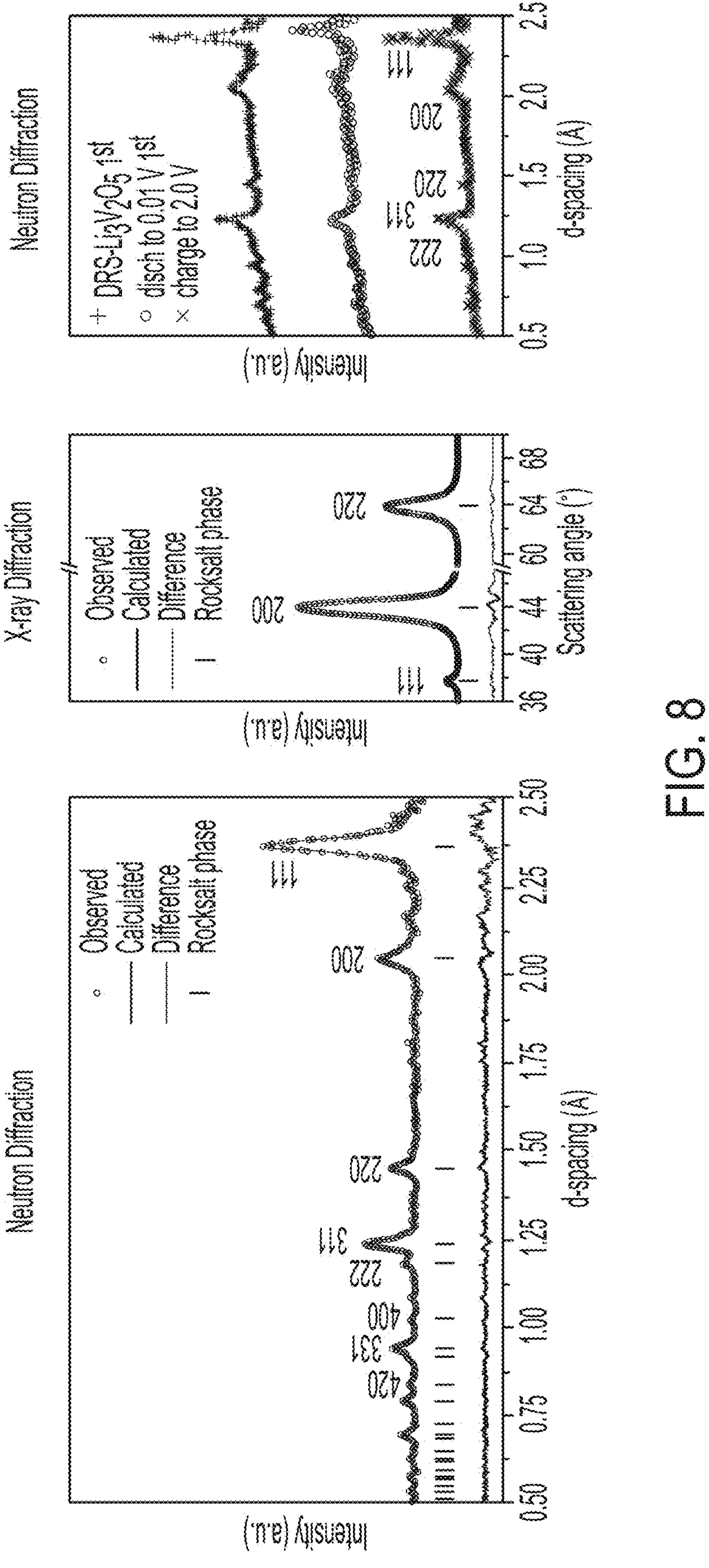
FIG. 8 illustrates the disordered rocksalt structure of preferred LVO as evaluated by neutron diffractions and X-ray diffraction, in some embodiments.

FIG. 8 illustrates the disordered rocksalt structure of preferred LVO as evaluated by neutron diffraction and X-ray diffraction. FIG. 8 shows that the disordered rocksalt structure is well-maintained during cycling. In some embodiments, an SEI layer is formed on the oxide surface, as expected in this potential region. In some embodiments, structural refinement shows that the lattice parameter change is only 1.8%, which translates to a volume change of 5.5%—much smaller than even graphite. The small volume change leads to an exceptional cycling stability, with negligible capacity decay for 1000 cycles, as shown in FIG. 7(*b*). The material also shows exceptional rate capability, delivering half of its capacity at 20 A/g, or in under 20 seconds, as illustrated by FIG. 7(*a*). LVO's stability, high rate capability, and working potential make it an ideal material to serve as a protection layer for Si.

EXAMPLES

The following experiments were performed to test the disclosed technology. The experiments are not intended to limit the scope of the invention.

Example 1: Thin Film Material Preparation

In this example experiment, Si and $V_2O_5$ thin films were deposited on a Cu substrate via electron-beam evaporation. A 200-nm-thick Si thin film on Cu substrate was chosen for baseline experiments. In order to physically protect as well as confine the Si film, a 300-nm-thick $V_2O_5$ film was deposited on both the top and bottom of the Si film, followed by annealing to achieve a crystalline phase of $V_2O_5$.

Figure 9:
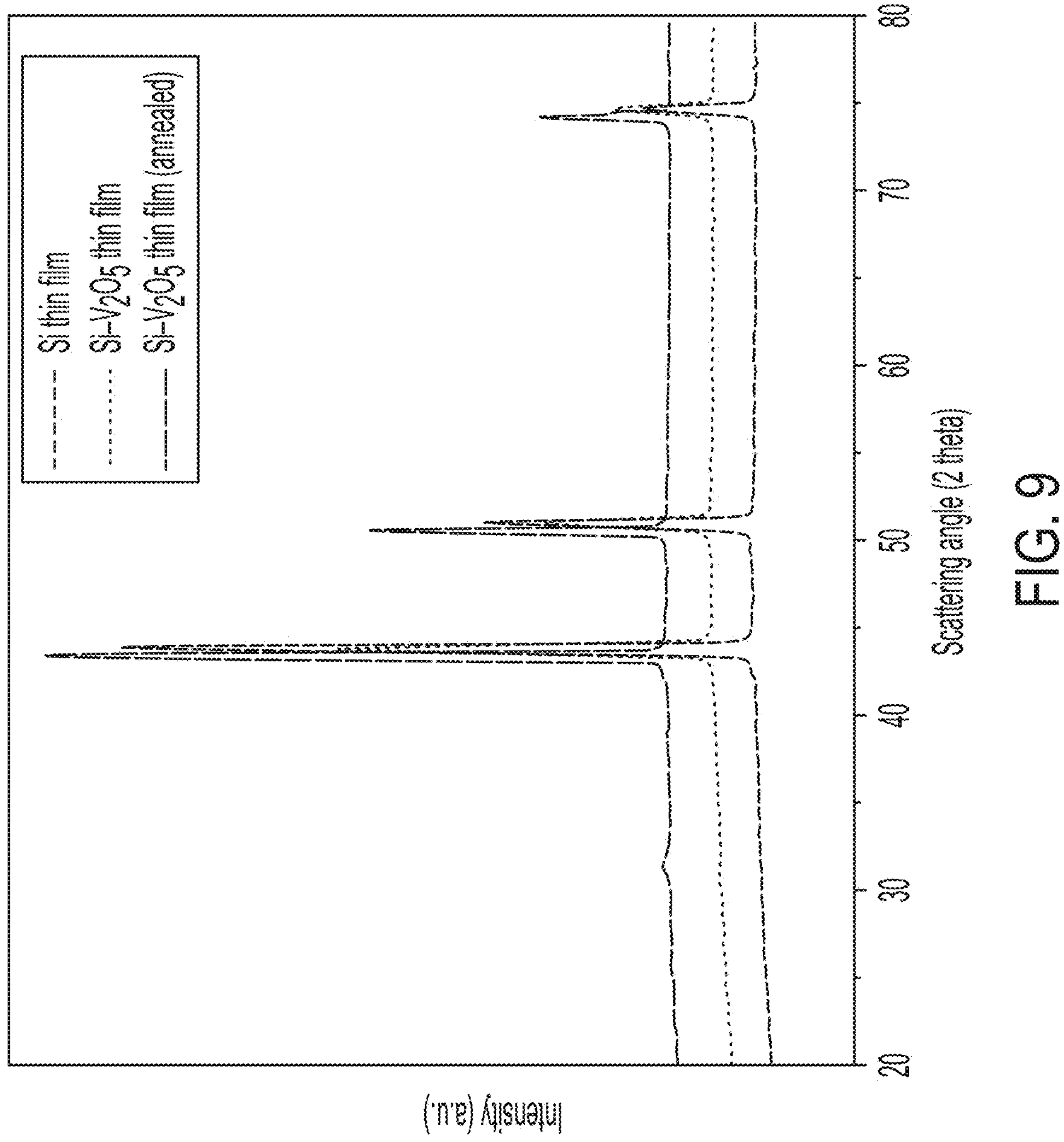
FIG. 9 displays XRD spectra of a Si thin film, a Si—$V_2O_5$ thin film, and a Si—$V_2O_5$ thin film after annealing, in Example 1.

The material crystal structures have been confirmed by X-ray diffraction (XRD). FIG. 9 displays XRD spectra of the Si thin film, the Si—$V_2O_5$ thin film, and the Si—$V_2O_5$ thin film after annealing. The $V_2O_5$ showed an amorphous structure after deposition, implying poor electrochemical performance. However, a crystalline phase appeared after annealing. After lithiation of $V_2O_5$, the disordered rocksalt phase $Li_3V_2O_5$ has considerable mixed conductivity and highly reversible capacity. The $Li_3V_2O_5$ film has excellent electrochemical cycling.

Example 2: SEM Analysis of $V_2O_5$—Si—$V_2O_5$ Tri-Layer Structure

Figure 10:
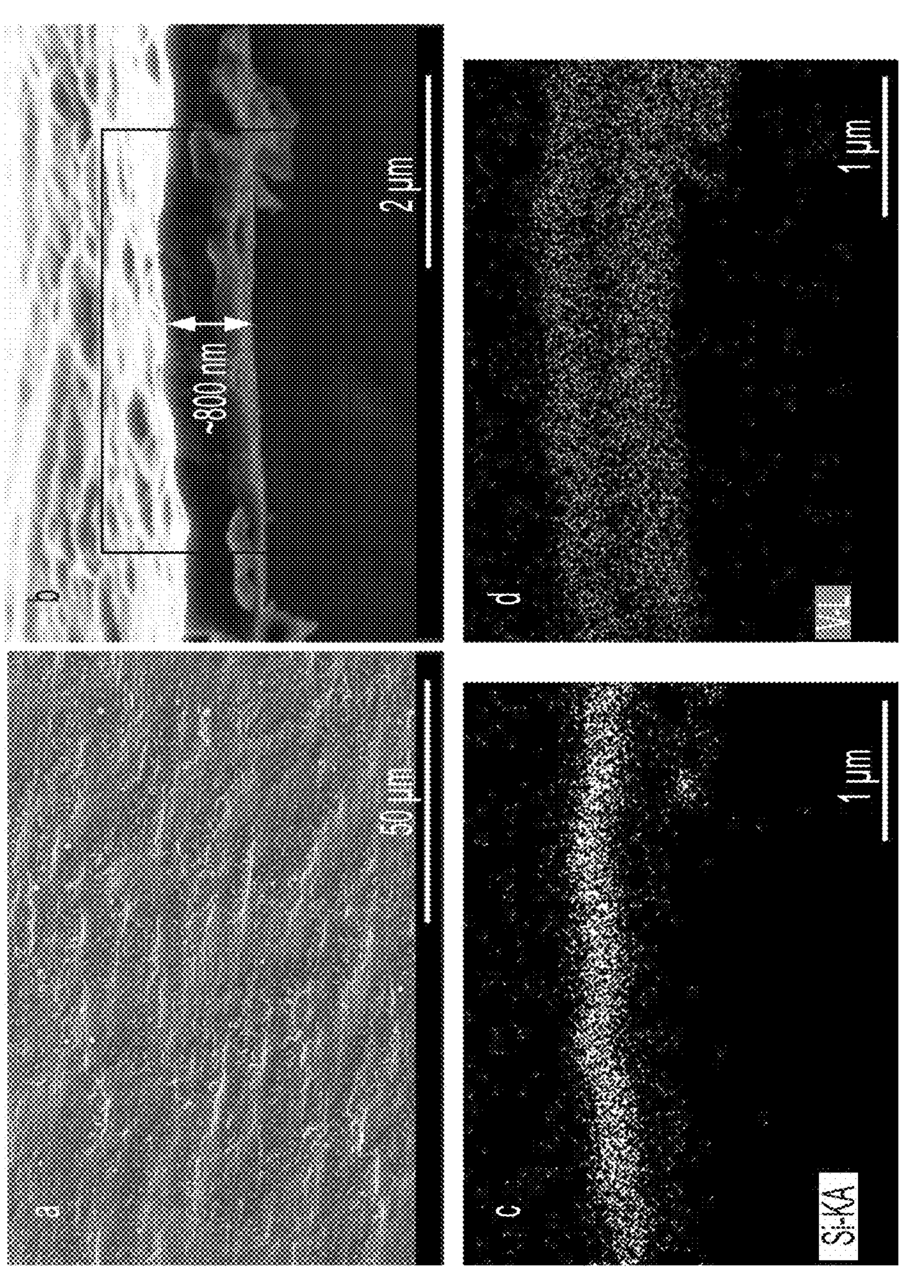
FIG. 10 show SEM and XRD images of a $V_2O_5$—Si—$V_2O_5$ tri-layer thin film design, in Example 2.

To analyze the structure of a $V_2O_5$—Si—$V_2O_5$ tri-layer, scanning electron microscopy (SEM) and energy dispersive X-ray analysis (XRD) were performed and the results are shown in FIG. 10.

As revealed in FIG. 10(*a*), the top surface of the tri-layer was quite smooth after annealing without any cracks or delamination. The tri-layer film thickness was measured using a cross-sectional SEM image as shown in FIG. 10(*b*). The total thickness was about 800 nm, which is consistent with indications from the electron-beam evaporator sensor.

Elemental analysis was applied using XRD to map the composition of the thin film. As shown in FIG. 10(*c*), element Si signals were concentrated at the center of the film; and as shown in FIG. 10(*d*), element V signals were concentrated at the top and bottom surface, implying a sandwich structure of Si and $V_2O_5$ wherein the $V_2O_5$ is outwardly disposed on each side of the Si. Based on the XRD images, the Si layer thickness is about 200 nm and the two $V_2O_5$ film thickness are about 300 nm.

These SEM and EDX images demonstrate a tri-layer thin film design, which is one embodiment of the presently disclosed technology.

Example 3: Testing Li||Thin Film Anode Battery

Figure 11:
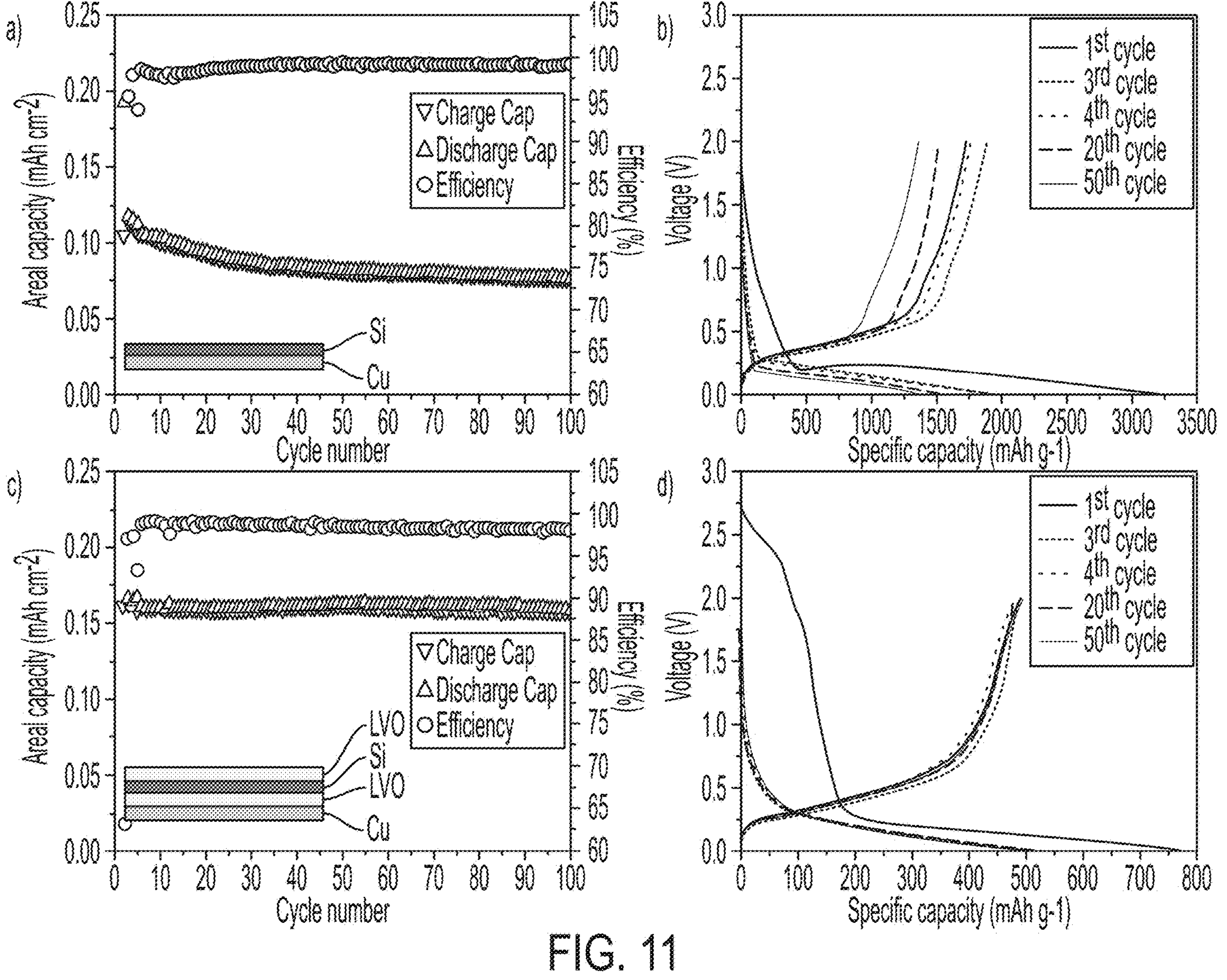
FIG. 11 includes four graphs of data from experiments that were performed to test the presently disclosed technology, in Example 3.

FIG. 11 includes four graphs of data from experiments that were performed to test the presently disclosed technology. In particular, FIG. 11 illustrates how the specific capacity and cycling rate of a LVO-Si-LVO sandwich structure used in some embodiments of the presently disclosed technology compares to that of an unprotected Si film. FIG. 11 (*a*) shows cycling performance of a Si thin film, FIG. 11 (*b*) shows voltage profiles of a Si thin film, FIG. 11(*c*) shows cycling performance of a tri-layer thin film half-cell, and FIG. 11(*d*) shows voltage profiles of a tri-layer thin film half-cell. The current density was 0.02 mA/cm$^2$ for the first 3 cycles, then 0.06 mA/cm$^2$. "Cap"=Capacity in FIG. 11.

The LVO-Si-LVO sandwich structure was fabricated by electron-beam evaporation. $V_2O_5$ and Si targets are used to first form a $V_2O_5$—Si—$V_2O_5$ structure on a copper substrate, wherein the thicknesses of the $V_2O_5$ and Si layers are about 300 nm and 200 nm, respectively. This structure is used directly as an electrode paired with a lithium counter. During the first cycle, the $V_2O_5$ is first lithiated to form $Li_3V_2O_5$, which is subsequently further lithiated along with lithiation of Si. Alternatively, or additionally, lithiation of $V_2O_5$ can also be accomplished chemically by reacting it with an lithiating agent such as butyllithium.

In one experiment, the baseline Si thin film was tested in a Li||thin film cell. Results are illustrated in FIG. 11(*a,b*). As shown in FIG. 11(*a,b*), at first discharge, the Si thin film showed over 3300 mA·h/g specific capacity with a ~0.2 V average voltage, corresponding to about 0.19 mA·h/cm$^2$ anode areal capacity. However, due to large irreversible capacity, after 3 formation cycles, there was only ~1600 mA·h/g specific capacity of Si left. The cell capacity retention was about 36% after 100 cycles, corresponding to 0.08 mA·h/cm$^2$ anode areal capacity. The fast capacity decay was also observed in the voltage profiles, as illustrated in FIG. 11(*b*). As shown, the discharge plateau shorted and shifted down continuously. One plausible explanation for this phenomenon is that parasitic reaction products not only decrease the cell capacity, but also increase the resistance of the cell.

In comparison, the tri-layer film was also tested in Li-thin film cells. The tri-layer film is LVO-Si-LVO, on Cu substrate. As shown in FIG. 11(*c,d*), there was an irreversible capacity after the first discharge, causing the specific capacity based on total composite weight to decrease from 790 mA·h/g to 510 mA·h/g. As observed in the first discharge voltage profile in FIG. 11(*d*), there were multiple short voltage plateaus between 2.5 V and 0.5 V, which corresponds to $V_2O_5$ lithiation. Thus, the irreversible capacity may have come from both Si and $V_2O_5$. As shown in FIG. 11(*d*), starting from the 1$^{st}$ charge, the voltage profile was quite smooth between 0.01 V and 2 V, due to the mixed lithiation processes of Si and $V_2O_5$. According to FIG. 11(*c*), a 0.16 mA·h/cm$^2$ highly reversible areal capacity was observed, doubling the capacity of a Si thin film anode with the same thickness. More significantly, starting from the 4$^{th}$ cycle, the cell maintained about 100% of the capacity after 100 cycles. The cyclability of the tri-layer demonstrates that LVO protection improves the Si-based anode cycle life.

FIG. 11 illustrates how the specific capacity and cycling rate of a LVO-Si-LVO sandwich structure compares to that of a 200-nm unprotected silicon film deposited on Cu. More specifically, FIG. 11 shows that the unprotected silicon film experiences gradual capacity decay with cycling. In sharp contrast, the LVO-Si-LVO sandwich structure shows essentially perfect capacity retention. In this type of half-cell test, the difference shows that LVO helps manage the volume expansion of Si and maintain the electrical contact.

Figure 12:
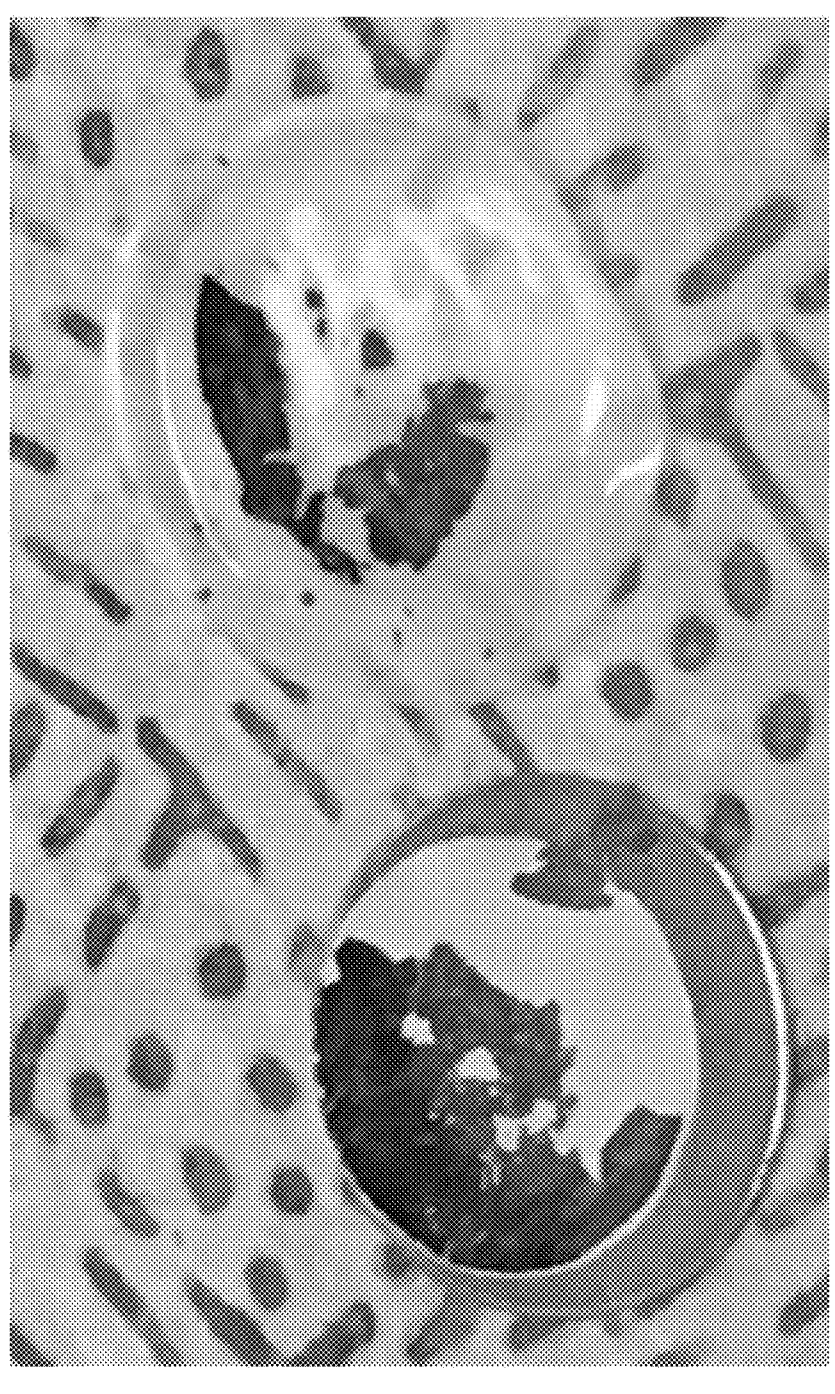
FIG. 12 displays a photographic image of a disassembled Si thin-film cell after 100 cycles, in Example 3.

FIG. 12 displays a photographic image of a disassembled Si thin-film cell after 100 cycles. After 100 cycles, the cell was disassembled to check the morphology of the Si thin film. As illustrated in FIG. 12, the Si film was fully delaminated from the Cu substrate, and did not maintain its integrity. The Si thin film exhibited fast electrochemical behavior degradation as well as mechanical failure as an anode. The LVO-Si-LVO sandwich structure is superior to the Si thin film.

Example 4: Cell Calendar Life Tests at Elevated Temperature

Figure 13:
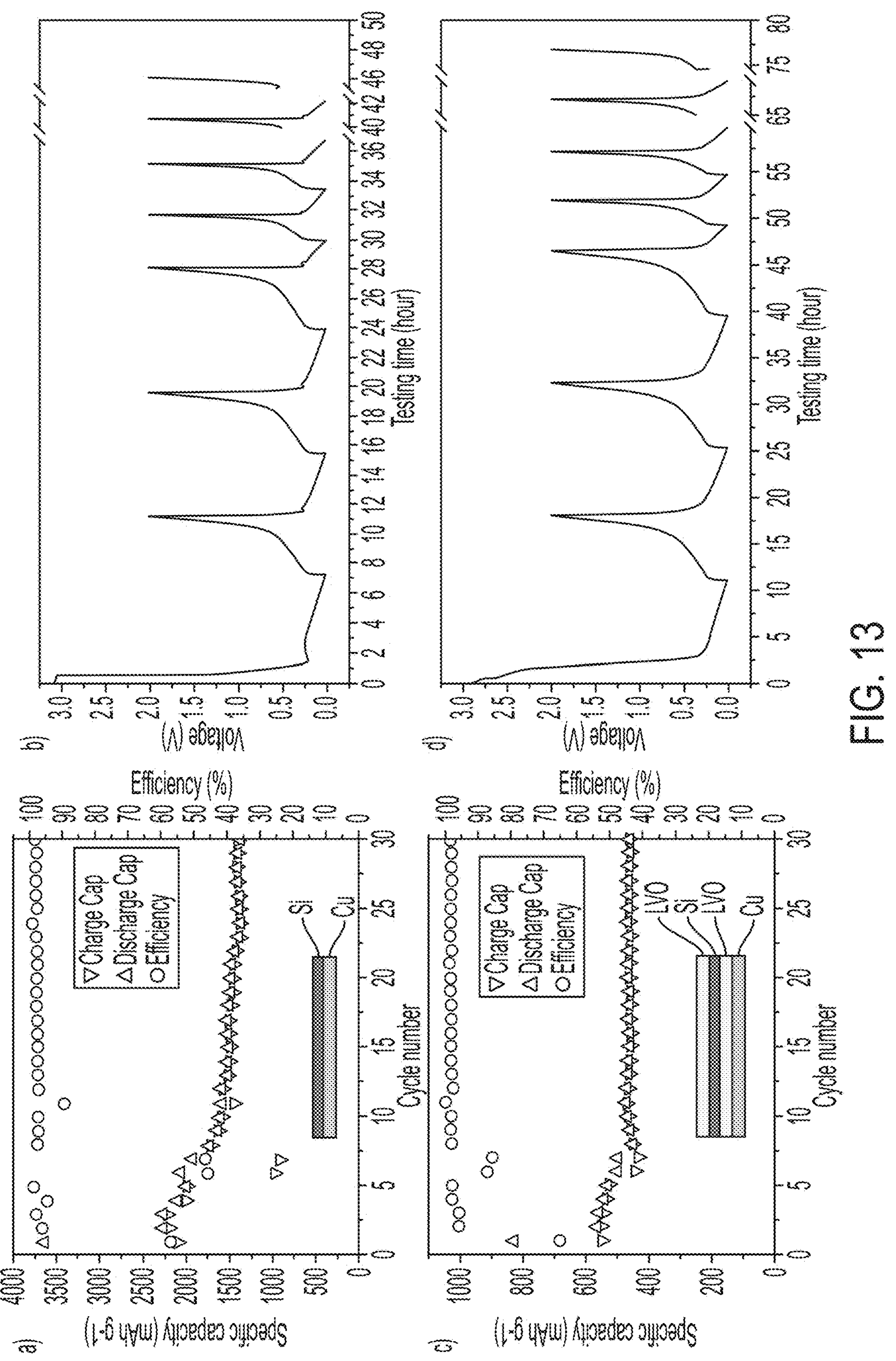
FIG. 13 shows graphs which illustrate cycling and calendar life tests for Si compared to LVO-Si-LVO thin film structures, in Example 4.

Experiments were performed to test the calendar life at elevated temperature. FIG. 13 shows graphs which illustrate cycling and calendar tests for Si compared to LVO-Si-LVO thin film structures. The same cell configurations as in Example 3 were utilized.

FIG. 13(*a*) shows cycling performance of a Si thin film. FIG. 13(*b*) shows voltage profiles of a Si thin film. FIG. 13(*c*) shows cycling performance of a LVO-Si-LVO tri-layer thin film half-cell. FIG. 13(*d*) shows voltage profiles of a LVO-Si-LVO tri-layer thin film half-cell. The cells were tested at 55° C. for 24 hours at a discharged state for the calendar life test, and after cooling down, the cells were charged at room temperature. The current density was 0.02 mA/cm$^2$ for the first 3 cycles, then 0.06 mA/cm$^2$.

After 3 formation cycles with a small current density, the cells were cycled at C/5. After the fifth discharge, the cells were disconnected from the battery tester, and rested at elevated temperature 55° C. for 24 hours, followed by a cooling-down process for about 1 hour. The cells were set back to the battery tester and the fifth charge process was started. The same processes were repeated one more time before setting the cell to normal cycle.

As illustrated in FIG. 13(*a,b*), a Li||Si thin film cell started with over 2000 mA·h/g discharge specific capacity at the fifth discharge. However, after the resting process, there was only ~1000 mA·h/g specific capacity left, with a coulombic efficiency less than 50%. The same data was reproduced at the sixth cycle, followed by continuous capacity decay cycles. Moreover, as illustrated in FIG. 13(*b*), the fifth and sixth charging voltage profiles displayed greater than 0.6 V open circuit voltage (OCV) before charging in some experiments. At the discharged state, the potential of the Si anode was supposed to be the same as Li metal, implying a minimum amount of self-discharge between cathode and anode. Both the OCV increase and the coulombic efficiency decrease suggest that the reactions between anode and electrolyte severely affect the calendar life of the Si-based anode.

As illustrated in FIG. 13(*c,d*), the tri-layer thin film-Li cell showed significantly improved calendar life performance. With LVO protection, the cell showed a ~520 mA·h/g reversible specific capacity after three formation cycles. After the resting process at an elevated temperature, the coulombic efficiency was 86% and 87% for fifth cycle and sixth cycle, respectively—a significant improvement over the baseline Si thin film cell. Moreover, there was no capacity decay in the later cycles, with even a slight capacity recovered. The OCV at the beginning of the fifth charge and sixth charge was around 0.4 V, implying a minimum amount of Li ions lost from anode.

As FIG. 13 demonstrates, the benefit of LVO protection may be more pronounced in elevated-temperature storage tests. For example, in the test illustrated in FIG. 13, on the 6th and the 7th cycle, Si was stored at 55° C. for 24 hours in its fully lithiated state after which the delithiation capacity was measured. As illustrated, in this example test, the coulombic efficiency dropped from a steady value of 98% to 45%, which is a significant drop. During the storage period of this example test, the cell was left in open circuit so the loss of capacity was not a result of periodic volume change during cycling. Rather, there was a dramatic reduction in lithium inventory due to leakage through the SEI layer. While the Si reversible capacity did not fully recover after full lithiation in the subsequent cycle, the reduction was relatively minor compared to the loss of active lithium during high-temperature storage. The example test illustrated in FIG. 13 demonstrates the challenge associated with the SEI on a Si anode, which does not appear to be as passivating with graphite. By contrast, the cycling and storage behavior of the LVO-Si-LVO sandwich structure was much better than the Li||Si thin film cell. With the LVO mediator layer, after storage at 55° C. for 24 hours in the fully lithiated state, the coulombic efficiency dropped only from 99% to 90%—in stark contrast to the Si with no protection. As a note, this was a demanding test because the area/volume ratio was very high given the thin film design.

The comparison between the example tests illustrated in FIG. 13 shows that LVO is a very effective protection layer for Si during high-temperature storage, which is an excellent indicator for the calendar life of the battery.

Example 5: Cell Calendar Life Tests at Room Temperature

Figure 14:
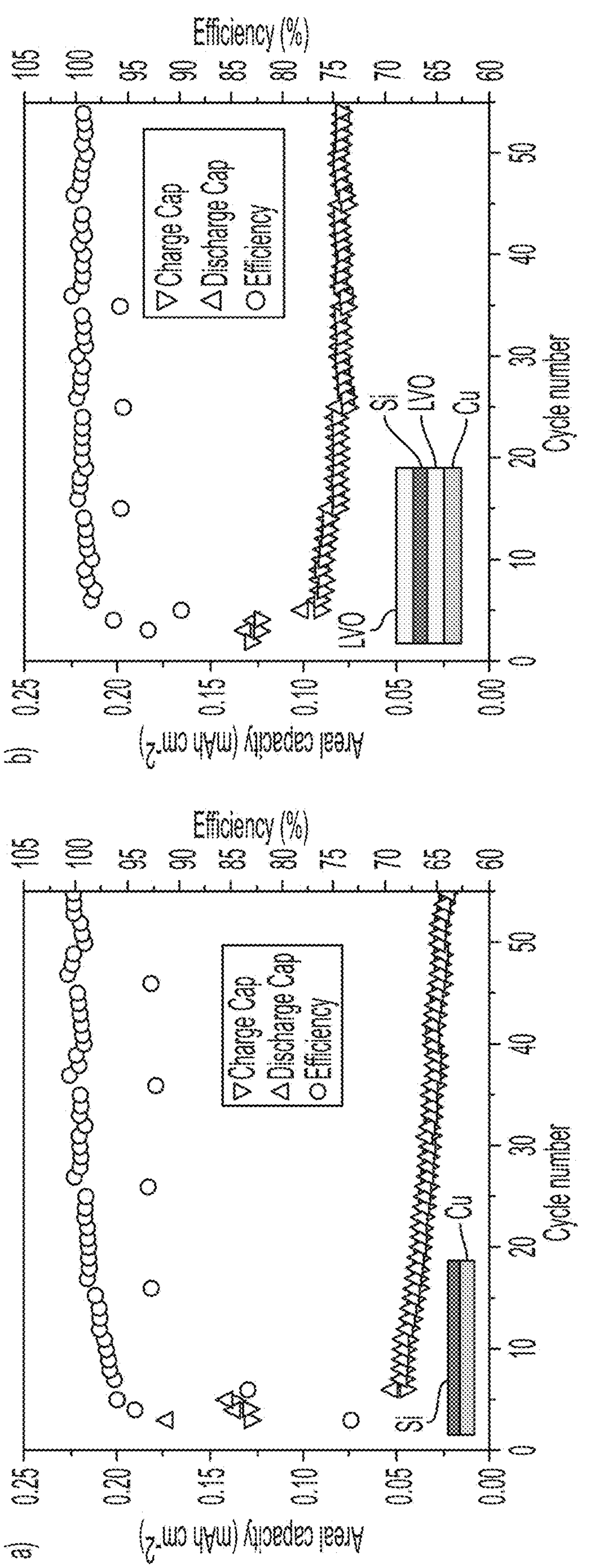
FIG. 14 shows graphs to elucidate calendar life at room temperature to verify the benefit of the LVO layer, in Example 5.

In order to further elucidate calendar life, more example tests were performed at room temperature (about 25° C.) to verify the function of the LVO layer. Results of these tests are illustrated in FIG. 14. FIG. 14(*a*) shows the cycling performance of a Si thin film. FIG. 14(*b*) shows the cycling performance of a LVO-Si-LVO tri-layer thin film half-cell. The cells were rested at room temperature for 24 hours at a discharged state. The current density was 0.02 mA/cm$^2$ for the first 3 cycles, then 0.06 mA/cm$^2$.

In these tests, the charge and discharge areal capacity of the first 3 formation cycles was ~0.14 mA·h/cm$^2$. However, starting from the fourth cycle, the areal capacity only delivered ~0.05 mA·h/cm$^2$ capacity. The large capacity may imply poor kinetics of the Si thin film. This implication would be consistent with the data shown in FIG. 11. As illustrated in FIG. 14(*a*), each cycle test consisted of repeating 10 cycles and a 24-hour rest at discharged state, which showed a clear trend in both coulombic efficiency and capacity retention. Despite the quick capacity decay at non-rest cycles, the average coulombic efficiency at rest cycle was about 92%, possibly resulting from severe parasitic reactions. In these tests, after 53 cycles, only 0.03 mA·h/cm$^2$ areal capacity remained.

The same calendar life test methodology was applied to the LVO-Si-LVO tri-layer. As illustrated in FIG. 14(*b*), the first 3 formation cycles contained 0.13 mA·h/cm$^2$ areal capacity, which dropped to 0.09 mA·h/cm$^2$ at the 4$^{th}$ cycle due to current density increase, which is less than 30% capacity loss. By comparison, the single Si thin film cell lost over 65% capacity at the 4$^{th}$ cycle. Here, the average coulombic efficiency of rest cycle after every 10 cycles was about 96%, indicating a significant improvement from Si thin film cells. After 53 cycles, there was 0.08 mA·h/cm$^2$ capacity remaining, implying a highly reversible system.

Examples 4 and 5 demonstrate improved calendar life when incorporating the LVO layer, at both elevated temperature and room temperature.

Example 6: SEM Analysis of Dissembled Cycled Cells

Figure 15:
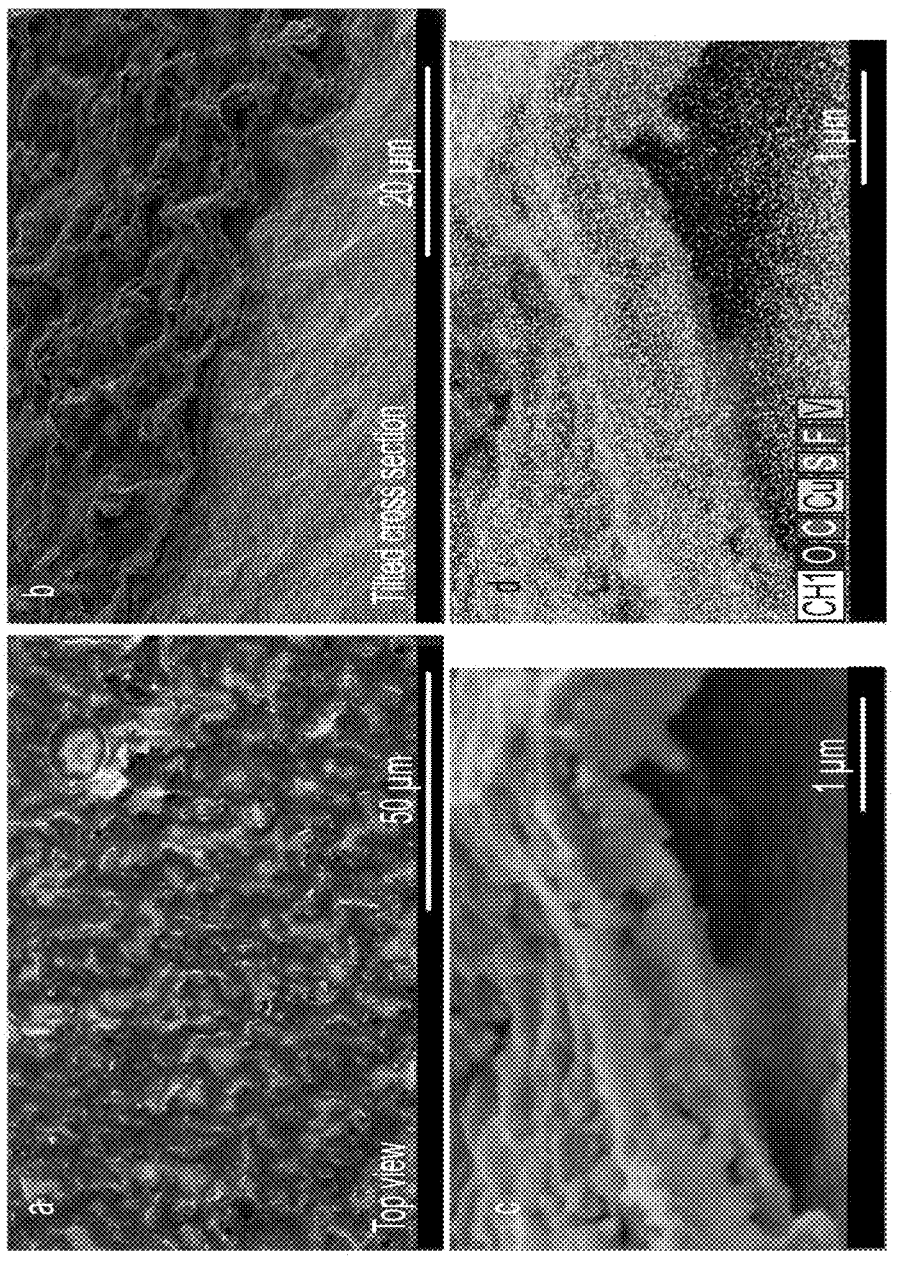
FIG. 15 displays a series of SEM and XRD images for disassembled cycled cells, in Example 6.

According to the above Examples, it was experimentally observed that there is little capacity loss in LVO-Si-LVO tri-layer cells after many cycles. In order to investigate further, SEM was performed on dissembled cycled cells. FIG. 15 displays a series of SEM and XRD images taken from example experiments. FIG. 15(*a*) shows a SEM image of a top view of a LVO-Si-LVO tri-layer cell after many cycles. FIG. 15(*b*) shows a SEM image of a tilted cross section of a LVO-Si-LVO tri-layer cell after many cycles. FIG. 15(*c*) shows a SEM image of a cross section of a LVO-Si-LVO tri-layer cell after many cycles. FIG. 15(*d*)

shows an EDX map of a LVO-Si-LVO tri-layer cell after many cycles, where the EDX map corresponds to the SEM image of FIG. 15(*c*).

As illustrated in FIG. 15, the tri-layer film was wrinkled and partially delaminated from the Cu substrate after many cycles. These observations may provide evidence to show the reason for capacity decay. For example, the EDX mapping in FIG. 15(*c,d*) clearly displays the tri-layer structure of the cycled films, implying that the three films adhered well together while delaminated from the substrate. This observation may confirm the $Li_xV_2O_5$ ($3 \le x \le 5$) function for physical barrier confinement. If the volume expansion which caused the delamination could be entirely eliminated, the cycling behavior may be even further enhanced.

In this detailed description, reference has been made to multiple embodiments and to the accompanying drawings in which are shown by way of illustration specific exemplary embodiments of the technology. These embodiments are described in sufficient detail to enable those skilled in the art to practice the technology, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the technology. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present technology. Other embodiments that do not provide all of the features and advantages set forth herein may also be utilized, without departing from the spirit and scope of the technology. Such modifications and variations are considered to be within the scope of the technology defined by the claims.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. It will be apparent to one of skill in the art how alternative functional, logical, or physical partitioning and configurations can be implemented to implement the desired features of the technology disclosed herein. Additionally, with regard to flow diagrams, operational descriptions, and methods, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the disclosed technology, whether or not such features are presented as being a part of a described embodiment. Thus, the breadth and scope of the technology disclosed herein should not be limited by any of the above-described exemplary embodiments. As will become apparent to one of ordinary skill in the art after reading this patent application, the illustrated embodiments and their various alternatives can be implemented without confinement to the illustrated examples.

What is claimed is:

1. An anode material comprising:

(a) a porous anode phase comprising silicon, wherein said porous phase is characterized by a porous-phase volumetric porosity that is selected from 20% to 70%; and (b) a first solid-state mediator layer outwardly disposed on said porous anode phase, wherein said first solid-state mediator layer contains a lithium vanadium oxide material, wherein said lithium vanadium oxide material is non-porous, wherein said lithium vanadium oxide material has a density of 2.0 g/cm$^3$ to 4.5 g/cm$^3$, wherein said lithium vanadium oxide material has a composition given by $Li_aV_bO_c$, wherein a=0.1-10, b=1-3, c=1-9, and a, b, and c are selected to charge-balance said $Li_aV_bO_c$, wherein said $Li_aV_bO_c$ is capable of being reversibly lithiated, wherein said $Li_aV_bO_c$ is crystalline, and wherein at least 90 wt % of said $Li_aV_bO_c$ has a disordered rocksalt structure in the Fm$\bar{3}$m space group.

2. The anode material of claim 1, wherein said anode material is a core-shell material in which said first solid-state mediator layer forms a shell that encapsulates said porous anode phase.

3. The anode material of claim 1, wherein said anode material is a sandwiched material in which said first solid-state mediator layer is outwardly disposed on a first side of said porous anode phase, wherein a second solid-state mediator layer is outwardly disposed on a second side of said porous anode phase, and wherein said second solid-state mediator layer contains said lithium vanadium oxide material.

4. The anode material of claim 1, wherein said first solid-state mediator layer further contains a dopant M that is chemically or physically contained within said lithium vanadium oxide material such that its composition is given by $Li_aV_bO_cM_d$, wherein d=0.1-3, wherein a, b, c, and d are selected to charge-balance said $Li_aV_bO_cM_d$, wherein said $Li_aV_bO_cM_d$ is capable of being reversibly lithiated, and wherein said dopant M is selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof.

5. The anode material of claim 1, wherein said silicon is present in said porous anode phase in a concentration from 1 wt % to 100 wt % Si.

6. The anode material of claim 1, wherein said silicon is amorphous silicon.

7. The anode material of claim 1, wherein said silicon is polycrystalline silicon.

8. The anode material of claim 1, wherein said silicon is single-crystalline silicon.

9. The anode material of claim 1, wherein said silicon has an average particle size from 10 nanometers to 100 microns.

10. The anode material of claim 1, wherein said silicon is present as particles with a particle geometry selected from the group consisting of spheres, columns, cubes, cylinders, tubes, wires, sheets, fibers, irregular shapes, and combinations thereof.

11. The anode material of claim 1, wherein said porous anode phase further contains graphite, graphene, carbon nanotubes, carbon black, vapor-grown carbon fiber, ultra-fine carbon, or a combination thereof.

12. The anode material of claim 1, wherein said anode material is present in an anode.

13. The anode material of claim 12, wherein said anode further contains graphite, non-graphitized carbon, silicon oxides, tin, tin oxides, or a combination thereof.

14. The anode material of claim 12, wherein said anode further contains one or more binders selected from the group consisting of carboxymethyl cellulose, styrene-butadiene rubber, styrene-butadiene copolymer, polyvinylidene fluoride, and combinations thereof.

15. The anode material of claim 12, wherein said anode is present in a cell, and wherein said cell further comprises a cathode, and wherein said cathode comprises a cathode material selected from the group consisting of $LiFePO_4$, $LiMn_2O_4$, $LiNi_{0.5}Mn_{1.5}O_4$, $LiNi_xCo_yMn_zO_2$ wherein x+y+z=1, $LiCoO_2$, $LiNi_xCo_yAl_zO_2$ wherein x+y+z=1, $LiFe_xMn_yPO_4$ wherein x+y=1, $aLiNi_xCo_yMn_zO_2 \cdot (1-a)Li_2MnO_3$ wherein a=0-1 and x+y+z=1, and combinations thereof.

* * * * *